US012762855B2

(12) United States Patent
Rooney

(10) Patent No.: US 12,762,855 B2
(45) Date of Patent: Oct. 13, 2026

(54) SYSTEMS AND METHODS FOR CALCULATING WATER RESOURCES USING AERIAL IMAGING OF CROP LANDS

(71) Applicant: IPQ PTY LTD, Adelaide (AU)

(72) Inventor: Thomas Henry Rooney, Fresno, CA (US)

( * ) Notice: Subject to any disclaimer, the term of this patent is extended or adjusted under 35 U.S.C. 154(b) by 603 days.

(21) Appl. No.: 17/840,497

(22) Filed: Jun. 14, 2022

(65) Prior Publication Data

US 2022/0406055 A1 Dec. 22, 2022

Related U.S. Application Data

(60) Provisional application No. 63/211,434, filed on Jun. 16, 2021.

(51) Int. Cl.

*G06V 20/10* (2022.01)
*G06V 10/26* (2022.01)
*G06V 10/764* (2022.01)
*G06V 10/82* (2022.01)
*G06V 20/13* (2022.01)
*G06V 20/17* (2022.01)

(52) U.S. Cl.

CPC .......... *G06V 20/188* (2022.01); *G06V 10/267* (2022.01); *G06V 10/764* (2022.01); *G06V 10/82* (2022.01); *G06V 20/13* (2022.01); *G06V 20/17* (2022.01)

(58) Field of Classification Search

CPC ...... G06V 20/13; G06V 20/17; G06V 20/188; G06V 10/82; G06V 10/267; G06V 10/764
See application file for complete search history.

(56) References Cited

U.S. PATENT DOCUMENTS 10,586,105 B2 * 3/2020 Freitag ................. G06V 10/774
10,846,843 B2 * 11/2020 Gonzalez ............... G06V 20/17
(Continued)

OTHER PUBLICATIONS

Y. Shen, G. Shen, H. Zhai, C. Yang and K. Qi, "A Gaussian Kernel-Based Spatiotemporal Fusion Model for Agricultural Remote Sensing Monitoring," in IEEE Journal of Selected Topics in Applied Earth Observations and Remote Sensing, vol. 14, pp. 3533-3545, 2021, doi: 10.1109/JSTARS.2021.3066055. (Year: 2021).*
(Continued)

*Primary Examiner* — Chan S Park
*Assistant Examiner* — Paulo Andres Garcia

(57) ABSTRACT

Systems and methods for determining groundwater levels based upon crop classification are provided. A set of aerial images are collected via satellite, manned aircraft or drones. They are filtered by a time domain, and a sufficiently high-resolution image is selected. If there isn't an image with sufficient resolution, a series of lower resolution images may be combined to generate a 'fused' image suitable for analysis. The image is then subjected to pre-processing. Crop boundaries within the image are determined, and areas outside of the crop boundary are masked off. The resulting image is subjected to a sliding window algorithm to generate discrete "patches" of the image suitable for analysis by a trained neural network. The neural network generated a classification for the crop. This data may be combined with surface water data, precipitation data, and weather pattern data to determine groundwater levels.

16 Claims, 9 Drawing Sheets

(56) References Cited

U.S. PATENT DOCUMENTS

| | | | | |
|---|---|---|---|---|
| 11,068,625 | B2 * | 7/2021 | Gates | A01C 21/007 |
| 11,074,447 | B1 * | 7/2021 | Fox | G06N 3/08 |
| 2016/0314586 | A1 * | 10/2016 | Lavigne | G06Q 50/06 |
| 2017/0053167 | A1 | 2/2017 | Ren et al. | |
| 2017/0083747 | A1 * | 3/2017 | Guan | G06V 20/188 |
| 2018/0130193 | A1 * | 5/2018 | Mithal | G06V 10/44 |
| 2019/0228224 | A1 * | 7/2019 | Guo | G06N 7/01 |
| 2019/0228225 | A1 * | 7/2019 | Guo | G06V 20/188 |

OTHER PUBLICATIONS

P. Bosilj, T. Duckett and G. Cielniak, "Analysis of Morphology-Based Features for Classification of Crop and Weeds in Precision Agriculture," in IEEE Robotics and Automation Letters, vol. 3, No. 4, pp. 2950-2956, Oct. 2018, doi: 10.1109/LRA.2018.2848305. (Year: 2018).*

López Valencia, O. M. er al. "Mapping groundwater abstractions from irrigated agriculture: big data, inverse modeling, and a satellite-model fusion approach", Copernicus Publications, Hydrol. Earth Syst. Sci., HESS, vol. 22, is. 11, sp. 5251, doi: 10.5194/hess-24-5251-2020 (Year: 2020).*

De Albuquerque AO, de Carvalho Junior OA, Carvalho OLFd, de Bem PP, Ferreira PHG, de Moura RdS, Silva CR, Trancoso Gomes RA, Guimaraes R.F., Deep Semantic Segmentation of Center Pivot Irrigation Systems from Remotely Sensed Data. Remote Sensing. 2020; 12(13):2159. https://doi.org/10.3390/rs12132159 (Year: 2020).*

Carvalho OLFd, et al. Instance Segmentation for Large, Multi-Channel Remote Sensing Imagery Using Mask-RCNN and a Mosaicking Approach. Remote Sensing. 2021; 13(1):39. https://doi.org/10.339/rs13010039 (Year: 2021).*

Waldner F, Hansen MC, Potapov PV, Law F, Newby T, Ferreira S, et al. (2017) National-scale cropland mapping based on spectral-temporal features and outdated land cover information. PloS ONE 12(8): e0181911. https://doi.org/10.1371/journal.pone.0181911 (Year: 2017).*

ISA/US, "Notification of Transmittal of the ISR and the Written Opinion of the International Searching Authority, or the Declaration," in PCT Application No. PCT/US2022/033664 Sep. 23, 2022, 12 pages.

Sapkota et al. "Mapping and Estimating Weeds In Cotton Using Unmanned Aerial Systems-Borne Imagery", AgriEngineering Jun. 16, 2020. Retrieved on Aug. 31, 2022. Retrieved from <URL: https://www.mdpi.com/2624-7402/2/2/24/htm> entire document.

Castano et al., "Methodology for Quantifying Groundwater Abstractions for Agriculture via Remote Sensing and GIS", Academia, Water Resour Manage (2010). Retrieved on Sep. 1, 2022. Retrieved from <URL: https://link.springer.com/article/10.1007/s11269-009-9473-7>entire document.

Kussul et al. "Deep Learning Classification of Land Cover and Crop Types Using Remote Sensing Data", IEEE Geoscience and remote sensing letters, 2017. Retrieved on Aug. 31, 2022. Retrieved from <URL: https://www.researchgate.net/profile/Andrey-Shelestov/publication/315939269_Deep_Learning_Classification_of_Land_Cover_and_Crop_Types_Using_Remote_Sensing_Data/links/5a0170914585159634c2f9f5/Deep-Learning-Classification-of-Land-Cover-and-Crop-Types-Using-Remote-Sensing-Data.pdf> entire document.

Li et al. "Object-Based Land-Cover Mapping with High Resolution Aerial Photography at a County Scale In Midwestern USA", Remote Sans. 2014. Retrieved on Aug. 30, 2022. Retrieved from <URL: https://www.mdpi.com/2072-4292/6/11/11372/htm> entire document.

Tarasiou et al. "Context-self contrastive pre-training for crop type semantic segmentation", arXiv:2104.04310v2 [cs.CV] Dec. 18, 2021. Retrieved on Aug. 31, 2022. Retrieved from <URL: https://arxiv.org/pdf/2104.04310.pdf> entire document.

* cited by examiner

SYSTEMS AND METHODS FOR CALCULATING WATER RESOURCES USING AERIAL IMAGING OF CROP LANDS

CROSS REFERENCE TO RELATED APPLICATION

This non-provisional application claims priority to U.S. Provisional Application No. 63/211,434, filed Jun. 16, 2021, of the same inventor and title, which application is incorporated herein in its entirety by this reference.

BACKGROUND

The present invention relates to systems and methods for calculating levels of renewable water resources, including groundwater, based upon crop type growing in a particular region. Given the need to conserve water resources to sustain both increasing human consumption and agriculture indefinitely, when combined with unpredictability of climate conditions and a growing need for food, sustainable groundwater management has become a critical and essential component of a long term solution to the water resource management.

A central component of managing groundwater is the ability to calculate, with some degree of accuracy, the levels of groundwater present. Groundwater is essentially distributed by the aquifer, which often is accessed on a patchwork basis due to the large cost of drilling wells. In contrast, surface water may be distributed using natural and manmade water courses that may provide a much more uniform, widespread and measurable distribution of water. Private access to and depletion of groundwater goes largely unmeasured, unmetered and unregulated. Ideally, groundwater measurement is performed using test wells; however, when looking at very large regions, the ability to have sufficient test wells, and the testing equipment needed to monitor these wells, is problematic, if not prohibitive.

It is therefore apparent that an urgent need exists for a system and methods for the monitoring and calculation of groundwater levels that is not reliant upon test wells. Such a system would utilize large datasets that span significant areas of land, in an extremely cost-efficient manner, in order to calculate groundwater levels.

SUMMARY

To achieve the foregoing and in accordance with the present invention, systems and methods for calculating groundwater levels using aerial imagery are provided. In particular, these systems and methods leverage machine learning classification of crops within the aerial images, and correlate these identified crops to groundwater levels.

In one embodiment, a set of aerial images are collected. These images may be visible light images or may include ultraviolet light and/or LiDAR imaging. The images are collected via satellite, manned aircraft or drones. After the images are collected they are filtered by a time domain, and a sufficiently high resolution image is selected. If there isn't an image with sufficient resolution, a series of lower resolution images may be combined to generate a 'fused' image suitable for analysis.

The selected or fused image is then subjected to pre-processing, such as color, saturation and contrast enhancement. Resolution algorithms may likewise be applied. Crop boundaries within the image are determined using edge identification, and continuity of patterns within the crop field. Areas outside of the crop boundary are masked off. The resulting image is subjected to a sliding window algorithm to generate discrete "patches" of the image suitable for analysis by a trained neural network. The neural network generated a classification, with attendant confidence levels, for the crop within the patch. These classifications may be aggregated across all patches of the field to determine what kind of crop the field is. This determination may be based upon the patch classifications with the highest confidences, the most frequent classifications of all patches, or some combination thereof.

Once crop type has been determined, this data may be combined with surface water data, precipitation data, and weather pattern data (which determines the water requirements of the crop, as well as aggregate evaporation) to determine net water loss or gain within a region. This gain or loss necessarily comes from the underlying aquifer, and thus this calculation may be leveraged to determine the groundwater levels.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

I. Water Management Platform

Figure 1:
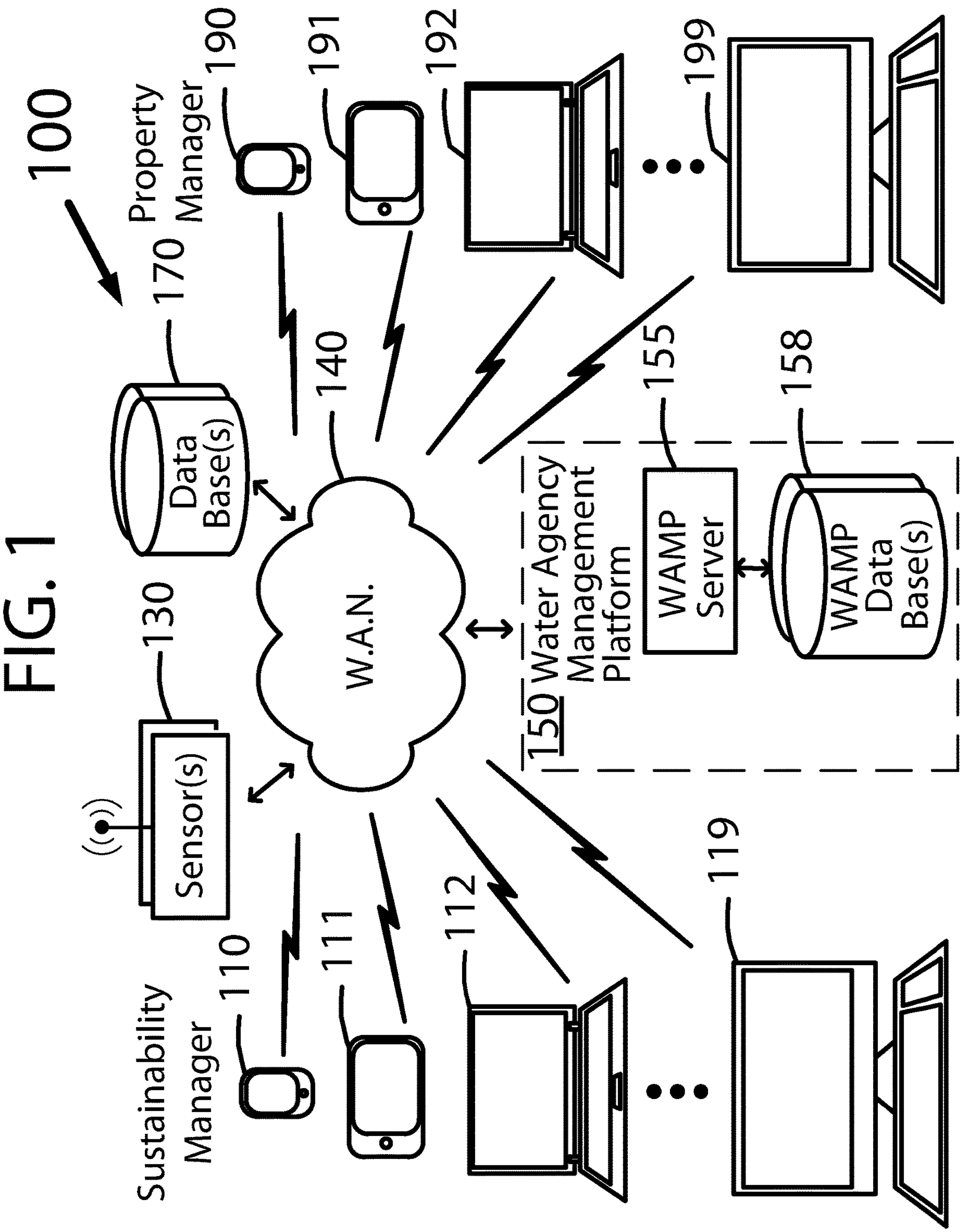
FIG. 1 illustrates an exemplary operating environment for one embodiment of a Water Agency Management Platform (WAMP), in accordance with the present invention.
Figure 2:
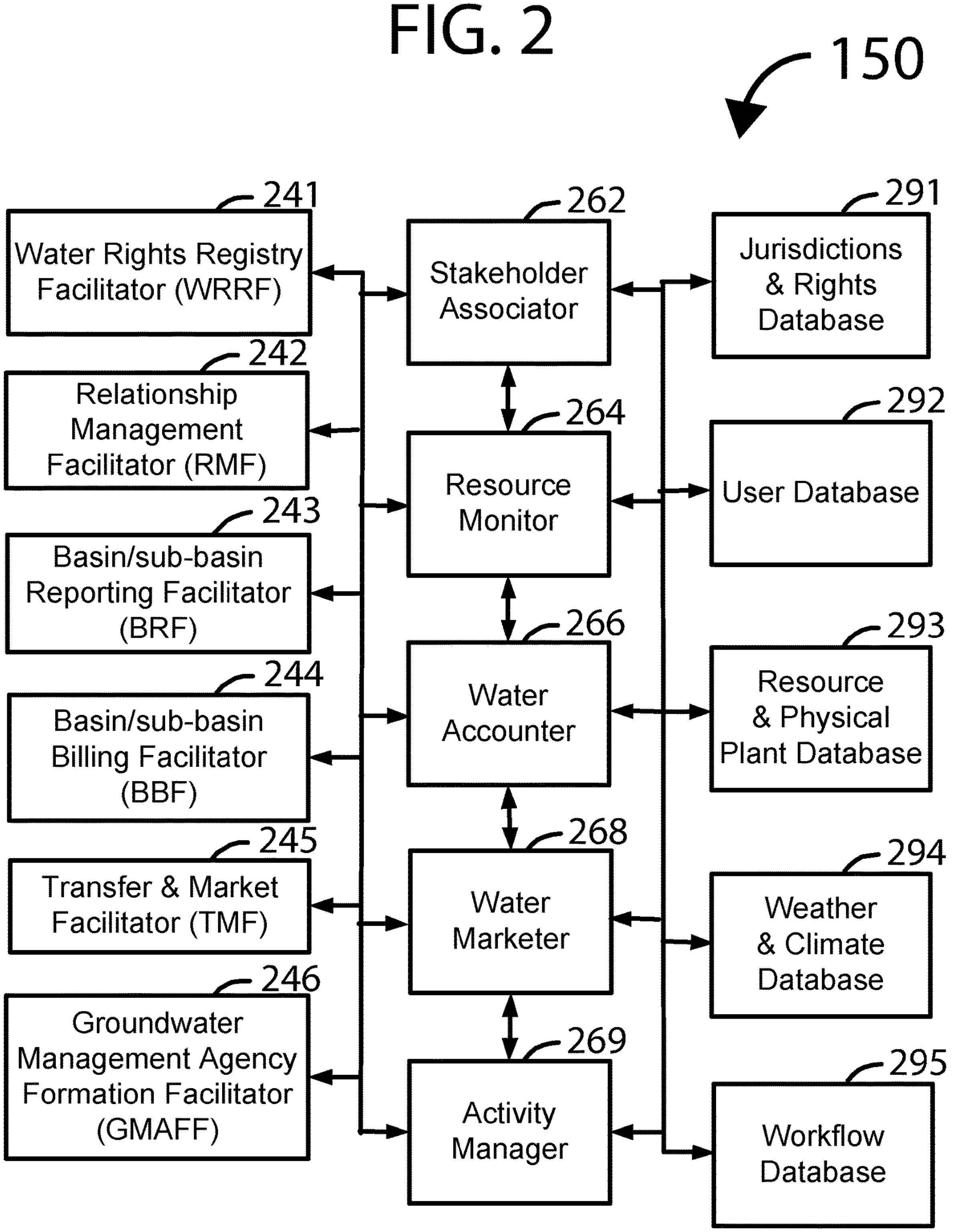
FIG. 2 is a functional block diagram further illustrating the WAMP of FIG. 1.
Figure 3:
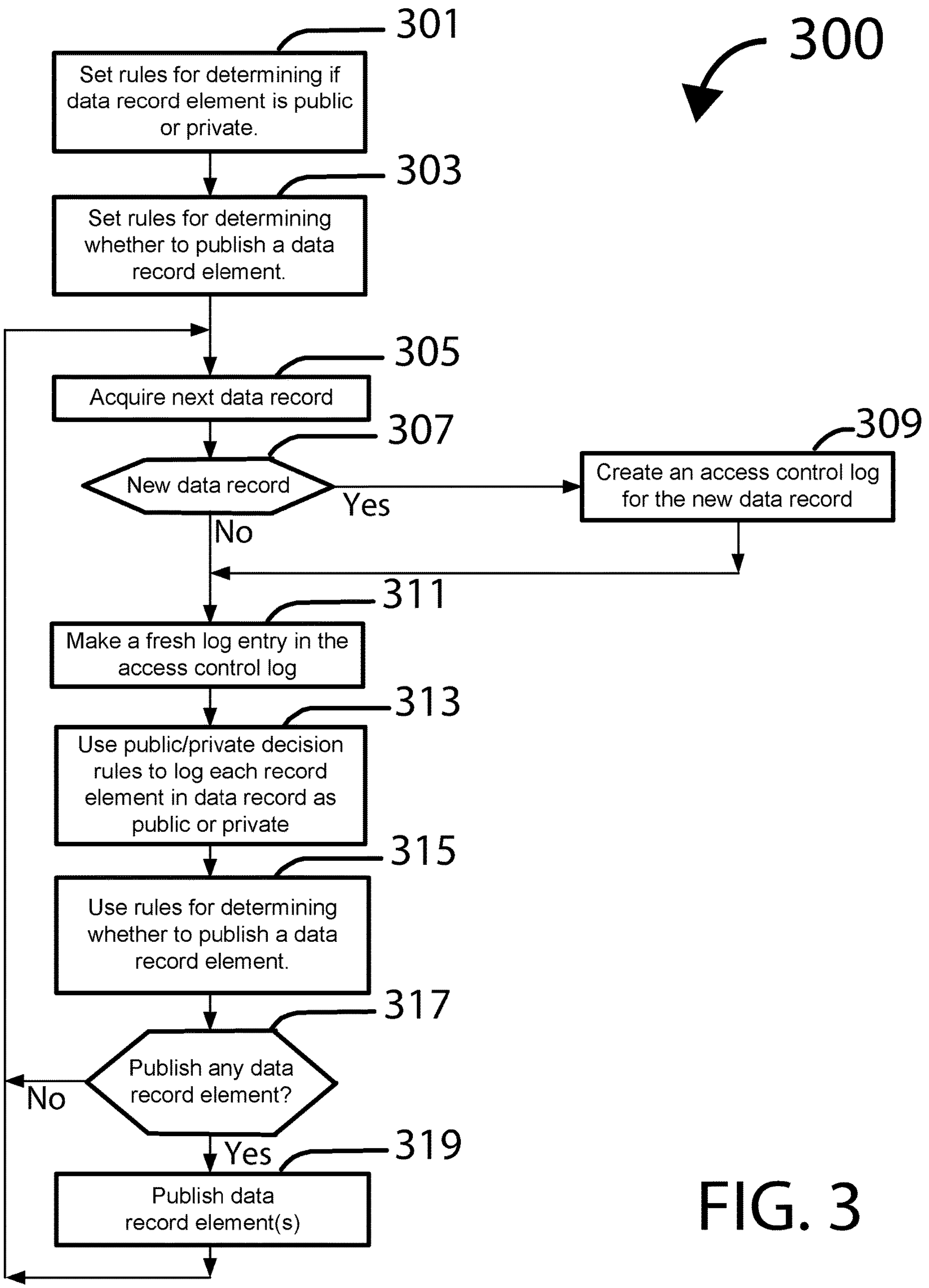
FIG. 3 is a Logic Flow Diagram illustrating an embodiment of a shared data access control engine for the embodiment of FIG. 1.

To facilitate discussion, FIGS. 1 through 3 illustrate the operation of a Water Agency Management Platform (WAMP) 150 in accordance with one embodiment of the present invention.

In some embodiments a WAMP 150 may facilitate the operation of a water agency and may facilitate such a water agency's regulatory compliance and implementation of a water resource regulatory body pursuant to corresponding regulation, compacts and law, such as a Sustainable Groundwater Management Act. The State of California for instance has legislated such a Sustainable Groundwater Management Act.

The Groundwater Foundation defines 'groundwater' (alternatively spelled 'ground water') as "the water found underground in the cracks and spaces in soil, sand and rock. It is stored in and moves slowly through geologic formations of soil, sand and rocks called aquifers." The United States Geological Survey (USGS) website says "Groundwater is a valuable resource both in the United States and throughout the world. Where surface water, such as lakes and rivers, are scarce or inaccessible, groundwater supplies many of the hydrologic needs of people everywhere. In the United States, it is the source of drinking water for about half the total population and nearly all of the rural population, and it provides over 50 billion gallons per day for agricultural needs." It continues by defining and describing 'ground water depletion': "Groundwater depletion, a term often defined as long-term water-level declines caused by sustained groundwater pumping, is a key issue associated with groundwater use. Many areas of the United States are experiencing groundwater depletion."

The Mojave Water Agency located in San Bernardino County California states on its website: "A groundwater basin is defined as an area underlain by permeable materials capable of furnishing a significant supply of groundwater to wells or storing a significant amount of water. A groundwater basin is three-dimensional and includes both the surface extent and all of the subsurface fresh water yielding material. For more information on groundwater basins and subbasins, please visit the California Department of Water Resources Bulletin 118 website." Furthermore, the California State Department of Water Resources Bulletin 118—California's Groundwater (Update 2003) Chapter 6 states: "A groundwater basin is defined as an alluvial aquifer or a stacked series of alluvial aquifers with reasonably well-defined boundaries in a lateral direction and a definable bottom. Lateral boundaries are features that significantly impede groundwater flow such as rock or sediments with very low permeability or a geologic structure such as a fault. Bottom boundaries would include rock or sediments of very low permeability if no aquifers occur below those sediments within the basin. In some cases, such as in the San Joaquin and Sacramento Valleys, the base of fresh water is considered the bottom of the groundwater basin."

In contrast to groundwater, surface water is defined by the web-site version of Duhaime's Legal Dictionary as: "Waters falling on the land by precipitation or rising from springs." For the purposes of the discussion that follows, surface water may be further understood to be: precipitated water or spring water that is directly open to the atmosphere or is conveyed from such a water source that is directly open to the atmosphere (e.g., water from a reservoir conveyed in an aqueduct pipe).

In the USGS Circular 1186 dated 1999 and titled "Sustainability of Groundwater Resources", 'groundwater sustainability' is defined as "development and use of ground water in a manner that can be maintained for an indefinite time without causing unacceptable environmental, economic, or social consequences." Such unacceptable consequences clearly include groundwater depletion and aquifer collapse.

The California Sustainable Groundwater Management Act, according to University of California Davis: "consists of three legislative bills, Senate Bill SB 1168 (Pavley), Assembly Bill AB 1739 (Dickinson), and Senate Bill SB 1319 (Pavley). The legislation provides a framework for long-term sustainable groundwater management across California. Under the roadmap laid out by the legislation, local and regional authorities in medium and high priority groundwater basins will form Groundwater Sustainability Agencies (GSAs) that oversee the preparation and implementation of a local Groundwater Sustainability Plan (GSP). Local stakeholders have until 2017 to organize themselves in Groundwater Sustainability Agencies. Groundwater Sustainability Plans will have to be in place and implementation begun sometime between 2020 and 2022. GSAs will have until 2040 to achieve groundwater sustainability." Furthermore the State of California groundwater website states: "In September 2015, Governor Brown signed SB13, by Senator Fran Pavley. The Bill makes various technical, clarifying changes to SGMA including requirements for groundwater sustainability agency formation, the process for State Water Board intervention if no responsible agency is specified for a basin, guidelines for high- and medium-priority basins, and participation of mutual water companies in a groundwater sustainability agency."

Further describing the role of GSAs under California's SGMA, the Association of California Water Agencies website states: "The act requires the formation of local groundwater sustainability agencies (GSAs) that must assess conditions in their local water basins and adopt locally-based management plans." The University of California Berkeley website says: "A successful path to groundwater sustainability will require governance that is both fair and effective. GSAs will need to carefully consider the criteria shown here in their institutional design, each of which is necessary to achieve both fairness and efficacy in groundwater management." Additionally it proposes nine criteria to evaluate newly forming GSAs: "scale, human capacity, funding, authority, independence, participation, representation, accountability, and transparency."

For the purposes of the discussion that follows, the term 'groundwater management agency' (GMA) may connote: an agency that may include but not necessarily be limited to the functions and responsibilities of a groundwater sustainability agency as defined by a given Sustainable Groundwater Management Act or equivalent legal mandate.

For the purposes of the definition of GMA above and of the discussion that follows, the term 'SGMA' may connote: a Sustainable Groundwater Management Act or other legislation, regulation, legal finding, compact or other legal basis that may mandate or otherwise legally authorize and provide jurisdiction to a GSA or GSAs relative to groundwater sustainability.

The CA.gov website defines a number of terms used in California's SGMA including 'sustainable yield', which is defined as: "The maximum quantity of water, calculated over a base period representative of long-term conditions in the basin and including any temporary surplus, that can be withdrawn annually from a groundwater supply without causing an undesirable result." Where 'undesirable result' is defined: "One or more of the following effects caused by groundwater conditions occurring throughout the basin:

1. Chronic lowering of groundwater levels indicating a significant and unreasonable depletion of supply if continued over the planning and implementation horizon. Overdraft during a period of drought is not sufficient to establish a chronic lowering of groundwater levels if extractions and recharge are managed as necessary to ensure that reductions in groundwater levels or storage during a period of drought are offset by increases in groundwater levels or storage during other periods.
2. Significant and unreasonable reduction of groundwater storage.
3. Significant and unreasonable seawater intrusion.
4. Significant and unreasonable degraded water quality, including the migration of contaminant plumes that impair water supplies.
5. Significant and unreasonable land subsidence that substantially interferes with surface land uses.
6. Depletions of interconnected surface water that have significant and unreasonable adverse impacts on beneficial uses of the surface water."

In contrast to a GMA, a surface water agency may be concerned with the management of surface water supplies including the accumulation, conservation, distribution of such surface water. So, per the Louisiana Department of Water Resources website, a surface water management agency may: "coordinate the management, preservation, conservation and protection of the state's water resources and has given authority for the agency to enter into cooperative agreements with water users for the withdrawal of surface water from the state's water bodies". So as an example of a surface water management agency in California's southern central valley: "In 1909, the South San Joaquin Irrigation District was established to provide a reliable and economical source of irrigation water for agricultural use in, and surrounding rural areas of Escalon, Manteca and Ripon. SSJID's historic water rights allow for several hydroelectric power plants on a series of dams and reservoirs on the Stanislaus River. SSJID and Oakdale Irrigation District completed the original Melones Reservoir in 1926, and have co-owned the Tri-Dam Project, consisting of Donnells, Beardsley and Tulloch reservoirs and powerhouses since 1957." And as a further example of a surface water management agency, in northern California, the San Francisco Public Utilities Commission: "We manage a complex water supply system stretching from the Sierra to the City and featuring a complex series of reservoirs, tunnels, pipelines, and treatment systems. We are the third largest municipal utility in California, serving 2.6 million residential, commercial, and industrial customers in the Bay Area. Approximately one-third of our delivered water goes to retail customers in San Francisco, while wholesale deliveries to 26 suburban agencies in Alameda, Santa Clara, and San Mateo counties comprise the other two-thirds." Additionally, in contrast to groundwater, surface water is commonly delivered to surface water customers—particularly irrigators—through a known connection to the distribution system commonly termed a 'turnout'.

As a practical matter, in order to sustainably manage a groundwater basin, nearly all groundwater extraction (as well as injection) needs to be regulated. Unfortunately, most existing water agencies are surface water agencies rather than GMAs. Additionally, the jurisdictions of most water agencies correspond to surface boundaries rather than the underlying groundwater basin boundaries. In fact many water agencies have boundaries that are politically rather than physically determined—e.g., confined within a politically defined area such as a state, county or city. Therefore, in many instances a given groundwater basin is overlain by a quiltwork of two or more existing water agencies.

One solution to overcome such fragmented management of a groundwater basin is to consolidate all the water agencies overlying that basin into a single GMA that supersedes such consolidated water agencies. For example, the Pajaro Valley Water Management Agency, a water agency in coastal central California is described: "The purpose of the Agency has remained essentially unchanged since its creation in 1984. In 1980, the State Department of Water Resources issued Bulletin 118-80, which identified 447 separate groundwater basins, sub-basins and areas of potential groundwater storage throughout the State. More importantly, the Bulletin identified the Pajaro Valley basin as one of just eleven basins with critical conditions of overdraft. Community leaders in the area recognized that local management of the basin was needed to halt seawater intrusion, which was impacting the groundwater supply for large areas of coastal farmland as well as domestic water supply wells. They also recognized that no single agency had the jurisdictional authority to manage the entire groundwater basin which overlaps four major jurisdictions: the City of Watsonville, and Santa Cruz, Monterey and San Benito counties. The Agency's boundaries were drawn as closely as possible to match the same basin boundaries described in Bulletin 118-80. See Agency Boundary Map. An ad hoc group of local stakeholders formed and began meeting weekly over a period of several months to develop the new agency's goals and draft the state legislation necessary to form a new water management entity. State Senator Henry Mello spearheaded the required legislation in Sacramento. A local ballot measure to establish the Agency was approved by the local voters in the November 1984 election, which officially established the PVWMA as a new state-chartered water management agency."

Such voluntary combining of water agencies into a single new consolidating and superseding water agency is an extremely difficult task due to the many competing interests of numerous stakeholders. Thirty years ago agencies such as the Pajaro Valley Water Management Agency were managed primarily with manual paper-based file systems augmented with some computerization. In the 21st century, complex combinations of networked database systems have become essential to the operation of most organizations including water agencies. Replacing multiple such complex computerized systems with an equally capable replacement computerized system may be a hugely daunting task. Additionally, increasingly severe political polarization—often pitting urban areas against rural constituencies—has made the sort of political compromise needed to charter new consolidated water agencies such as Pajaro Valley Water Management Agency nearly impossible. Clearly, another solution other than consolidation is needed.

An alternative approach to consolidation into a single basin-wide GMA is for a plurality of water management agencies (with jurisdictions that when considered together encompass an entire groundwater basin) to operate cooperatively so as to virtually synthesize key elements of the operation of a single consolidated basin-wide agency, but with fewer technical and political hurdles. For the purposes of the discussion that follows, such a cooperative basin-wide virtual agency may be referred to as a 'virtual groundwater management agency' (VGMA).

As opposed to a consolidation into a single basin-wide water agency, a VGMA may facilitate but not supersede or preempt multiple water agencies cooperating within a shared groundwater basin. A VGMA may facilitate such GMAs to cooperatively manage that basin's water resources and further may facilitate each of the cooperating GMAs to meet their respective sustainability reporting obligations under the governing SGMA. Furthermore, such reporting obligations may rest exclusively upon the individual cooperating GMAs and not the VGMA. A VGMA may not replace or explicitly limit or assume the governance powers or obligations of each individual GMA.

For the purposes of this discussion, the term 'district' may refer to: a specific geographic territory over which a given GMA may have authority, and that may include one or more water consumers under the jurisdiction of that GMA. Such water consumers may include groundwater extractors who directly consume such extracted groundwater or provide it to others to consume. Further, for the purposes of this discussion the terms 'member' or 'members' may refer to: property owners (as well as legal assignees and interest holders) under the jurisdiction of a given GMA. One or more such members within a GMA's district may be property owners with historical, deeded, optioned, leased, purchased or otherwise granted, awarded, claimed or otherwise acquired groundwater rights (GWRs). Being a member of a given GMA may be voluntary or mandated or a mix of both. A member may for example be a natural person or a legal entity such as a corporation, LLC, holding company or trust. A GMA may maintain information (e.g., owner(s), address, assessor's parcel number, size, etc.) pertaining to a given property within the GMA's district—i.e., a 'property account'. A GMA member may own (or otherwise control interests in) more than one properties in the GMA's district and therefore be associated with more than one property account.

In some embodiments, a VGMA may be thought of as a type of a GMA composed of participating constituent water agencies. For the purposes of the discussion that follows, when the term 'GMA' is used, it may be assumed unless stated otherwise that the discussion applies equivalently to a VGMA. Furthermore, the term 'GMA' may be assumed to apply equivalently to a surface water management agency (unless stated otherwise) should such a surface water management agency manage or utilize groundwater resources or anticipate doing so.

Additionally, for the purposes of the discussion that follows, the combined districts of the constituent water agencies of a given VGMA comprise the 'district' of that VGMA although such VGMA district may be virtual. Furthermore, the members of such constituent water agencies of a given VGMA may be termed 'VGMA members' (or similar) although such membership in the VGMA may be virtual. And unless stated otherwise, all discussions applying to a GMA's district and/or member(s) of GMA may apply equivalently to the district and/or member(s) of a VGMA. Furthermore, unless stated otherwise, all discussions applying to users of GMA's WAMP 150 may apply equivalently to users of a VGMA's WAMP 150.

For the purposes of the discussion that follows, the terms 'sustainability manager' or 'sustainability managers' may refer to: employee(s), contractor(s) and other worker(s) for a given GMA who may utilize the WAMP 150 to manage the resources of the GMA. Furthermore, for the purposes of the discussion that follows, the terms 'property manager' and 'property managers' may refer to: GMA member user(s) of the WAMP 150. For example, a property manager may be a property owner within the GMA district or may be an individual or commercial entity that works for such a property owner. In some instances, such an individual or commercial entity may be a property manager for more than one property within the GMA district.

A WAMP 150 may facilitate the operation of a GMA and facilitate the GMA's regulatory compliance and implementation of governmental and industry standards—such as the Californian, Sustainable Groundwater Management Act (SGMA). A given GMA's sustainability manager(s) may utilize a WAMP 150 to innovatively and reliably service properties and property managers within their district(s) including providing reasonable controls necessary for the GMA to manage their groundwater sustaining service and the system that provides that service. In addition to facilitating GMA sustainability managers to ensure the sustainable management of groundwater, a WAMP 150 may be utilized by property managers to manage their groundwater production and consumption and to monitor the overall state of the groundwater basin they draw from.

In some embodiments, a WAMP 150 may facilitate multiple GMAs with authority or commercial interests within a given basin to cooperatively and cost-effectively manage—to their mutual benefit—the groundwater sustainability of that basin and operate as a seemingly single integrated commercial entity while maintaining and protecting their separate commercial interests and carrying out their respective responsibilities. A WAMP 150 may for example facilitate a VGMA to configure and utilize common forms, letterhead, water utilization fee and regulatory policies, and regulatory agency(s) interface. Additionally, a WAMP 150 may facilitate generating reports that taken together may provide a comprehensive overview of the water usage and transfers within the VGMA's basin.

A VGMA may be facilitated by a WAMP 150 in some embodiments so as to assist two or more GMAs (or other water management agencies) within a basin district cooperatively manage their respective jurisdictions, protect the privacy of individual members within an individual GMA's specific district while enabling de-identified aggregated data to be reported to and utilized by the VGMA to assist the cooperating GMAs to administer the basin on a coordinated basis. In turn, such data aggregation by a WAMP 150 may support the VGMA to create and provide reports to, for example, a supervisory government authority in fulfillment of the requirements of a SGMA. Additionally, such reporting utilizing aggregated basin-wide data may in turn help the constituent GMAs make decisions about the management of groundwater resources within their basin segments and assist each GMA with auditing and regulatory reporting requirements.

A WAMP 150 may facilitate the constituent GMAs of a VGMA to maintain their relationships with their members while complying and contributing to the implementation of their region's groundwater sustainable management regulations by cooperating as a VGMA. In some embodiments, for a groundwater basin within a given VGMA's district and jurisdiction, a WAMP 150 may:

- provide exclusive and relatively coherent regulatory mandated administration of the basin's groundwater resources,
- organize and service members of the participating agencies as members of the VGMA,
- provide a single uniform source of basin-wide accounting and reporting.

In order for a VGMA to function effectively (e.g., not injure the interests of the participating agencies) and yet sustainably manage shared groundwater resources, a VGMA-facilitating WAMP 150 in some embodiments may segment and group the authorities, functionalities and responsibilities (i.e., "powers") of each of the thusly participating agencies so as to group subset(s) of such powers that may be essential to groundwater sustainability while keeping segregated subset(s) of other powers that may be non-essential to groundwater sustainability (but may be of critical proprietary interest to each of the individual participating agencies within the VGMA). In some embodiments of a WAMP 150, such aggregated subset(s) and segregated subset(s) may be configurable such that the composition of such subsets may vary from VGMA to VGMA depending, for example, on the degree of cooperation or competition between the participating agencies within a given VGMA.

In many areas, GMAs (let alone VGMAs) don't yet exist and surface water management agencies seem a natural fit to be adapted to the role of GMA or VGMA constituent because they have existing:

- Trained staff,
- Political and community connections,
- Long term relationships with property owners and managers,
- Property account data including water use history,
- Distribution systems to move water between sellers and buyers—including between basins,
- Revenue flows and access to capital,
- Relationships with neighboring agencies,
- Extensive surface water utilization data (very useful in instances where a property uses both surface water and groundwater), and
- Deep institutional and historical knowledge of drainage and basin conditions.

Also, in some instances existing surface water agencies may already be extracting groundwater and combining it with surface water supplies. Or a surface water agency may have customers that are pumping groundwater from private wells and using it in conjunction with water supplied from the surface water management agency. Clearly, a surface water management agency is a natural stakeholder in any groundwater basin that is drawn on by that agency or by its customers.

In some instances, a GMA may be a standalone entity whose governance structure consists of representatives from water agencies, local government and water users. The day to day activities of the GMA may be sub-contracted to existing water agencies or other third parties.

Unfortunately GMAs (as well as water management agencies in general) may have financial and commercial disincentives to share data or relationships—particularly when they overlap in watersheds and or groundwater basins. However, a WAMP 150 may facilitate creation of a VGMA combining, but appropriately firewalling data from multiple water management agencies cooperating as a seemingly single VGMA.

In some embodiments, a WAMP 150 may include facilities specific to the management of surface water resources. This for instance may allow a surface water agency to transform to a GMA (either immediately, or in a phased process, or sometime in the future) and manage both surface water and groundwater in an integrated fashion. Although a WAMP 150 may be utilized by a GMA to facilitate its operations, in some embodiments, a WAMP 150 may be configured to be utilized by a surface water management agency to facilitate its operations with or without configuring facilities for groundwater management. Such an adopting surface water management agency may thusly benefit from the state-of-the-art integrated water management facilities of a WAMP 150 and additionally benefit from a built-in WAMP 150 configurable path to groundwater management—perhaps as a GMA and/or as a constituent water management agency in a VGMA.

The two principal stakeholders of a given GMA—the GMA itself and the members—may be the primary users of a WAMP 150 utilized by the GMA. In addition to a given GMA's principal stakeholders, i.e., the GMA itself and the members of that GMA, a given GMA may have various additional direct or indirect stakeholders within the district. Such in-district GMA stakeholders may include, but not be limited to:

- Surface water rights holders,
- Surface water management agencies,
- Non-agricultural water consumers and their water agencies,
- Groundwater recharge area property owners,
- Local politicians and/or government officials, and
- Sovereign entities such as Native American reservations.

In addition to sustainability managers and property managers, other GMA stakeholders (some out of district) may be users of a GMA's WAMP 150. For example, water brokers might utilize services of the WAMP 150 on behalf of water consumers and possibly investors.

FIG. 1 provides a structural block diagram for an example of a Water Agency Management Platform (WAMP) 150 operating environment in accordance with an embodiment of the present invention. In some embodiments a WAMP 150 may be a multi-layered secure cloud based software solution that may facilitate the operation of a groundwater management agency (GMA), and may furthermore facilitate regulatory compliance and implementation of a water resource regulatory body pursuant to corresponding regulation, compacts and law, such as a Sustainable Groundwater Management Act (SGMA). Such a WAMP 150 may be accessed from any location—critical for example in the irrigation industry where the system needs to be accessed by a property manager at work out in the field—perhaps out in a feed lot or an almond orchard.

A WAMP 150 may be accessed using a mobile communication device or any other electronic network terminal device with a user interface. For brevity, an electronic network terminal device may be referred to as a 'terminal', which can either be a dedicated purpose-built device or a suitable general purpose device. FIG. 1 represents a variety of such potential terminals—110 to 119 for sustainability managers, and 190 to 199 for property managers.

Sustainability manager terminal choices, 110 through 119, represent the multiplicity of devices that may support access to WAMP 150. Often such terminals are mobile communication devices—i.e., devices that can be carried easily from place to place by the sustainability manager—typically with Wi-Fi or cellular data or other wireless connectivity and in numerous instances with built-in mobile telephone capability. However, less portable or fixed installation terminals may also support access to the WAMP 150.

Property manager terminal choices, 190 through 199, mirror the choices available to a sustainability manager. They differ specifically in the role of the WAMP 150 user, i.e., property manager rather than sustainability manager, and the specific device chosen by each individual user.

In some embodiments, a user's access to a WAMP 150 may not be bound to a specific terminal device. So for example, during the day, a sustainability manager may utilize a laptop 112 at their desk, while a property manager may utilize a smart phone 190 out in a farm field. Further by example, in the evening, a sustainability manager may utilize a home PC 119, while a property manager gets caught up on work from home utilizing a tablet computer 191.

When describing use of the WAMP 150 that is equivalent whether by a sustainability manager or a property manager, the term 'User' may be used in the discussion that follows to mean either of these two types of users.

At the level of network connectivity, a sustainability manager's terminal and a property manager's terminal may operate in equivalent ways, therefore for simplicity: the terms 'User's device' or 'User's terminal' may be used in the discussion that follows when operation of a WAMP 150 feature applies in the same or similar fashion to either a sustainability manager's terminal or a property manager's terminal.

Inter-communication between a User's terminal device and the WAMP 150 may use a wide area network (WAN) 140 such as the Internet. Communication between a User and the WAMP 150 may involve traversing more than one WAN (not shown). In some embodiments, WAMP-facilitated communication between a sustainability manager and a property manager may also involve a WAN or WANs such as the PSTN and/or the Internet. Depending on the embodiment, the WAMP 150 may use one or several models of connectivity including, but not limited to: client/server and peer-to-peer. In some embodiments, a WAMP 150 may utilize a client-server system model where the client may execute on the User's device—perhaps as a web app or a native app. Client/server connectivity may use a WAN 140 such as the Internet for access between the User's terminal device and a WAMP Server 155. Peer-to-peer connectivity, such as a WAMP-facilitated telephone call or a text message interaction between a sustainability manager and a property manager, may typically also use a WAN 140 such as the PSTN or the Internet.

In some embodiments, services of a WAMP 150 may be utilized via telephony—for example, using keypad menuing and/or automated natural language recognition as is easily apparent to one skilled in the art. In some embodiments, a live or automated operator (e.g., a chat bot) may provide WAMP service assistance or proxying. Furthermore, in some instances, a User's terminal device that is dedicated to providing data access, e.g., a desktop computer, 119/199, may be augmented for telephone communication by a separate telephony device (not shown) and/or third party telephony software (not shown) running on the terminal device. Such separate telephony devices may include, but not be limited to: a mobile cellular phone or a landline telephone, or a headset paired with third party telephony software running on the terminal device, e.g., Skype.

In some embodiments, communication between a sustainability manager and a property manager may be intermediated by a WAMP 150. In such intermediation—sometimes referred to as 'proxying'—a WAMP 150 may source, receive, reroute, multicast, broadcast or otherwise initiate or respond to and/or terminate communication: from a sustainability manager (or on a sustainability manager's behalf) intended for a property manager, and/or; from a property manager (or on a property manager's behalf) intended for a sustainability manager. In addition, a WAMP 150, may translate, clarify, expand, simplify, repeat, and/or generally modify or enhance the content communicated between Users in such a way as to improve or enhance comprehension or to increase the likelihood of successful completion of the communication. Such intermediation services may have varying mixes of automation and/or direct human participation depending on the embodiment.

Additionally, a WAMP 150 may translate, clarify, expand, simplify and otherwise modify or enhance what is communicated. At a signal content level, a WAMP 150 may amplify, filter, encode, decode, transcode, compress, expand, error correct and generally process the signal corresponding to the communication in ways well understood to one well versed in the art.

In some embodiments, data communication may be intermediated by a WAMP 150 in such a way that logical network addresses—e.g., web site URLs and email addresses—nominally routed directly to a User are actually routed to and/or sourced from and/or redirected by a WAMP 150. For example, the WAMP 150 may provide additional services to a GMA or on a GMA's behalf including, but not limited to: Web site, email, blog, on-line forum/social network posts, electronic newsletters, and push notifications to GMA members.

In some embodiments, text messaging communication may be intermediated by the WAMP 150 in such a way that logical texting addresses—e.g., Universal Resource Identifiers—nominally routed directly to a User are actually routed to and/or sourced by and/or redirected by and/or translated by the WAMP 150. For example, the WAMP 150 may provide additional services to a sustainability manager or on a sustainability manager's behalf including, but not limited to: text-email translation, text-voice translation, system-to-system gateway (e.g., between SMS and IM) and push text messaging notifications to members.

The services of the WAMP 150 may be provided by a WAMP Server 155, which may utilize one or more WAMP Database(s) 158 containing information regarding GMA members (and perhaps other users) who may utilize the WAMP 150. The primary users of a WAMP 150 may be sustainability managers and property managers. In some embodiments, WAMP data may be encrypted and/or physically secured in data centers complying with standards such as: FISMA, SSAE16 Type II and PCI DSS 2.0 standards.

Property-descriptive and member-descriptive data may be entered into the WAMP Database(s) 158 automatically by importing from one of more sources including: a legacy operations system, or manually by GMA staff, or in some instances voluntarily by property managers themselves. In some embodiments, this data may be augmented with data from third parties, which may be copied or simply utilized on a one-time basis. Such descriptive data for a given property, member or property manager may be referred to as a 'profile' or for multiple members/properties or in aggregate—'profiles'. Profiles may be stored in WAMP Database(s) 158 and may be organized, portioned, sorted, encrypted, firewalled, access-restricted, backed-up, transaction logged and otherwise managed, maintained and protected using techniques familiar to one skilled in the art.

The WAMP Database(s) 158 used by the WAMP 150 may be centralized or distributed. Generally, the WAMP Database(s) 158 utilized by a WAMP 150 may be remote from the User's terminal; however in some embodiments, portions of database(s) utilized by a WAMP 150 may reside on the User's electronic terminal device (not shown). For example, web browser cookies may be stored on a User's device. In some embodiments, the WAMP 150 may be coupled to one or more External Database(s) 170 via WAN 140.

In some embodiments, External Database(s) 170 may be queried by WAMP 150 to extract useful information. Such External Database(s) 170 may belong to various different government and private entities and may be distributed globally, and may for example include news sources such as Weather Channel, CNN, CBS & PBS and/or Federal and State governmental agencies such as FEMA. A given External Database 170 may contain publically available government data, such as NOAA climate data and GOES satellite images, or may contain MDA Information Systems EarthSAT images or other data available on a commercial basis. In some instances, a WAMP 150 may import data from a given External Database 170 such as a county government tax assessor's property roll. In some instances, a WAMP 150 may export data to a given External Database 170—for example providing a given GMA's basin-specific water sustainability reporting to an SGMA mandated regulatory authority.

A number of third party organizations, such as USGS, NOAA, Army Corp of Engineers, US Bureau of Reclamation as well as regional water authorities and universities maintain large databases containing water resource data, satellite terrestrial surface and subsurface images and/or climate and weather data—observed and/or modeled. The WAMP 150 may import and utilize data from such third party External Database(s) 170. Hence, a given GMA may have access to a very rich dataset distributed across a virtual aggregate database or virtual composite database comprised of WAMP Database(s) 158 plus data accessed and/or acquired from third party's External Database(s) 170. For simplicity in the following discussion, when referring to representative WAMP Database(s) 158, such a larger virtual aggregate or composite database including External Database(s) 170 may be taken to be referenced as well—as is apparent to one skilled in the art.

In some embodiments, Sensor(s) 130 may provide data to a WAMP 150. Sensor(s) 130 data such as well bore water level measurements or well water meter readings that may for example be utilized to quantify groundwater extraction. In some embodiments, Sensor(s) 130 may include meteorological instruments and weather equipment, such as barometers, humidity detectors, precipitation gauges, anemometers, thermometers and solar cells. Sensor(s) 130 may also include test wells located within aquifer(s) to monitor aquifer characteristics including current level and rate of water table change. In some instances, Sensor(s) 130 may be of many functional types distributed on a wide geographic basis within a GMA's jurisdiction. Wireless communication may provide a typical means for communications with Sensor(s) 130, but other means such as wired connectivity may be utilized as well. Most Sensor(s) 130 may be relatively small, simple and inexpensive devices owned by the GMA, or by vendors to the GMA, or perhaps by GMA members. In some instances, Sensor(s) 130 may be large, complex and expensive, e.g., an earth imaging satellite with ground-penetrating radar owned perhaps by the US government. Many Sensor(s) 130 may be statically located on a specific property. However, other Sensor(s) 130 may be moved about—perhaps my motor vehicle, or airplane, helicopter, balloon or aerial drone. Autonomous terrestrial and aerial drones may increasingly provide dynamic Sensor(s) coverage as technology evolves. Additionally, nano-technology may be expected to provide for a very low-cost means to blanket a GMA's jurisdiction with thousands, millions or perhaps billions of Sensors 130. In anticipation of nanotechnology, Sensor(s) 130 may use marker chemicals or dyes to map out basin boundaries and measure aquifer flows.

In general, industry best practices may be applied so as to comply with any legal mandates, regulatory requirements, or industry consensus on the protection of private, sensitive and proprietary information or otherwise privileged information. Encryption may be applied to protect information in WAMP Database(s) 158 and also protect information communicated between Users and a WAMP 150, between other WAMP 150 users (such as third parties) and a WAMP 150, and between Sensor(s) 130 and a WAMP 150. In many embodiments, encryption may occur as appropriate using technologies familiar to one skilled in the art, such as Secure Sockets Layer (SSL), Transport Layer Security (TLS) and Virtual Private Network (VPN).

In some embodiments, a WAMP 150 may facilitate a GMA's operations with secure, auditable process(es) for managing and maintaining records of "Groundwater Extraction Rights" such as those rights created, mandated and/or recognized as a result of California's SGMA. Such systematic, verifiable and traceable process(es) may provide a GMA with a strong level of substantiation and therefore protection from potential conflict with GMA members—such as lawsuits due to asserted accounting errors on a given property's water extraction balance or ownership or other property or water rights interests. Furthermore, in some embodiments, a WAMP 150 may facilitate configuring, populating and maintaining a 'water extraction rights registry' (WER registry), which may be stored in a WAMP Database(s) 158. Such a WAMP 150 WER registry (not shown) may potentially be utilized as a single source of truth of groundwater extraction rights within a GMA's jurisdiction—thereby assisting in both comprehensive management and conflict resolution.

A WAMP 150 WER registry may for example combine extensive data for the properties within a given basin with mapping, Global Imaging Satellite (GIS) information and perhaps other measurements to provide a comprehensive overview of groundwater use within that basin including land ownership and acreage, crop-cycle information, water use requirements, actual and/or estimated water use and changes to water extraction rights (i.e., leased or purchased). Some such data collection and/or aggregation may be automated such that corresponding data in a WER registry may be updated on an on-going basis so as to keep it current—perhaps updating in real time. Such extensive water resource data may include but not be limited to location of extraction, volume of water use, and historical water use as well as: property location, boundary, and ownership information perhaps acquired from appropriate sources such as a county recorder's database. WER registry data (perhaps along with other measured, reported and imported data) may be aggregated, de-identified and analyzed by a WAMP 150 to provide an up-to-date basin-wide (or sub-basin-wide) comprehensive view of water use and groundwater extraction, including data from water meters and from participation in fallowing programs.

Litigation, financial audit or other time period specific inquiry may require a copy of a GMA's WAMP 150 WER registry as it existed at some prior date and time. In some embodiments a WAMP 150 may log changes to a GMA's WER registry or otherwise record incremental changes to such a registry such that a date/time instant-specific instance of that registry may be displayed or otherwise produced.

A WAMP 150 may be highly scalable: allowing multiple sustainability managers to simultaneously input, store, access, edit, update, and otherwise process and share (as appropriate) data for a multiplicity of GMA members. Furthermore, an WAMP 150 may provide service-configurating facilities to activate/de-activate one/some/all member services provided by WAMP 150, e.g., newsletter, reporting, WER registry, trading access and other WAMP services—perhaps district-wide or on a member or property account specific basis.

Utilizing contact information entered in WAMP 150 property accounts, a WAMP 150 may be utilized by a GMA as a powerful communications facility to interact with property managers. For example, SMS, email and or voice communications may be sent automatically or "at the click of a button", removing the requirement for integrating multiple third party systems and reducing overall costs. In some embodiments, a WAMP 150 may include facilities enabling:

- every sustainability manager to provide the highest possible standards of property manager engagement,
- per-property scheduling of billing, invoicing and notices,
- scheduling of automated contact reminders for property managers—such as emailed newsletters, event notifications and scheduled phone call cycles,
- logging and maintaining full per-property-account contact history—including recorded (and therefore reproducible evidence of) phone, voicemail, email and scanned.

In some embodiments, WAMP 150 may facilitate a GMA to record and subsequently access contact details as well as written, electronic and voice communications with property managers and/or third parties. By providing a historical record of all such communications, a WAMP 150 may save time and money while facilitating a comprehensive professional support and outreach service from a GMA to their served members and stakeholders as well as third parties such as a governmental regulatory department.

In some embodiments, A WAMP 150 may facilitate a sustainability manager to configure a set of one or more secure WAMP 150 facilities that a property manager (or an appropriately authorized third party) may utilize. In some embodiments, such a set of WAMP 150 facilities may be instantiated as a system default of a WAMP 150. Such a set of WAMP 150 facilities may for example facilitate a property manager to access, edit and update their profile and/or other information managed within a property account by a WAMP 150—for instance updating contact or billing information. For a given property account, a member may be a groundwater provider, a groundwater consumer, or both. Furthermore, a property manager may perhaps manage more than one separately owned property—each with separate property accounts. Consequently, a given property manager may be associated by a WAMP 150 with one or more property accounts where the given property manager may perhaps have differing management roles for each.

A WAMP 150 may have major advantages over third party Customer Relationship Management (CRM) systems in that a WAMP 150 may seamlessly integrate with the WER registry and therefore support complex property account changes such as transferring water rights interests. Nonetheless, in some embodiments, a WAMP 150 may configured to interoperate with a given third party CRM system utilized by a GMA. Such an incumbent CRM system may be strongly integrated into the business operations of such a GMA—with multiple staff trained on and loyal to the incumbent third party and perhaps resistant to change. A WAMP 150 may for example import and perhaps augment member-specific information managed by such an incumbent CRM system perhaps on a repeated basis to remain current with changes to a GMA's membership. In other embodiments, a WAMP 150 may overlay a user interface onto a third party CRM. By utilizing such an incumbent CRM analogous to an external data base for the WAMP 150, a WAMP 150 may import and export property account records between the WAMP 150 and the GMA's incumbent CRM. Furthermore, the data base record definitions of such an incumbent CRM may be augmented so as to support the operation of the WAMP 150 as a GMA migrates from away from a legacy CRM system.

In some embodiments, a WAMP 150 may facilitate a GMA to configure and produce custom-tailored reports. For example, a WAMP 150 may import surface water utilization data for a given property account in order to calculate and report how much of overall water utilization is supplied to that property by surface water as opposed to groundwater. A WAMP 150 may facilitate configuring reporting intervals for a given report and the method in which a given report is to be initiated (manually by a Sustainability Manager or automatically by a WAMP 150). A WAMP 150 may provide a range of sophisticated reporting facilities—allowing the generation of charts, diagrams, maps and various downloads to give sustainability managers instant access to and analysis of aggregated data pertaining water utilization in their groundwater basin.

In some embodiments, a WAMP 150 may facilitate producing unique district-specific or basin-specific groundwater analytics reports with access to and distribution of such reports controlled securely by the WAMP 150 as configured by the GMA. For example, a WAMP 150 may facilitate a given GMA to produce customized SGMA-compliant physical or electronic reports with WAMP system software updates supporting new SGMA-compliant report requirements as they become known. So for example in California, a WAMP 150 may facilitate the current and future needs of individual GMAs to provide reports to the state government authority to fulfill the requirements of the Sustainable Groundwater Management Act. Furthermore, all reporting requirements under California's Sustainable Groundwater Management Act may be automated through a WAMP 150. For example, a WAMP 150 may facilitate configuring reporting intervals as well as the method in which a given report is to be undertaken (physical or electronic). Such reports may be scheduled periodically for automatic production in addition to being produced on an as-needed basis. A WAMP 150 may be configured to distribute a given report internal to the GMA as well as potentially to a configured set of property accounts and/or third parties such as government agencies. Therefore, such reports including the groundwater analytics they may contain may assist GMA sustainability managers and/or their property managers counterparts with future business planning.

Reporting facilities in some embodiments of a WAMP 150 may be configured to meet the specific needs of a given GMA as dictated in part by its groundwater resources, commercial interests, its property account and property managers needs, and governmental edicts. Such a reporting facility thusly configured may provide precisely the required information as and when it is needed. Furthermore, reporting facilities may be configured to distribute for a limited time or to a proscribed list of distributees so as to support one-off circumstances such as experimental projects.

Reporting facilities provided by WAMP 150 may for example be configured to include, but not be limited to:

- Generation of automated emailed reports to GMA staff, property accounts and property managers or third parties on a regular (or demand) basis—ensuring everyone may stay informed and up-to-date,
- Automated distribution of reports to managers on financial management and expected expense outcomes. These may be individually configured such that variations from expected results are immediately picked up and reported to appropriate GMA staff or appropriate third parties, and
- Automated SMS and email of selected report notifications and/or reports, so for example a report may be successfully distributed even if the receiving property manager is in the field on a tractor.

In some embodiments, a WAMP 150 may facilitate a GMA to collect fees—i.e., calculate the amount of fees, distribute invoices, track payments and export fee data to external systems and applications such as a variety of accounting software packages. A GMA may configure a WAMP 150 to calculate and charge: a fixed fee, fee per acre foot, tiered fee, (or a mix of) based on an individual property or perhaps on a basin/sub-basin wide level.

In some embodiments, WAMP 150 billing analytic facilities may facilitate a GMA to obtain reports on overdue accounts, best/quickest payers and/or top payers. Furthermore, such billing analytics may compare current billing against prior bill runs and member payment performance to aid a GMA in revenue and water demand forecasting.

Additionally, a WAMP 150 in some embodiments may be custom configured by a GMA to accommodate the local circumstances of the irrigation industry so as to most effectively integrate into the GMA's business operations. Furthermore, a WAMP 150 may have major advantages over other more generic billing systems in that it may seamlessly integrate with the WAMP 150 WER registry. Therefore, once billing criteria may be configured by the GMA, a WAMP 150 may automatically apply all such criteria to every property account in the GMA's business domain as determined by factors such as: landholdings, water use, water rights or whatever other basis that may deemed appropriate by the GMA and/or regulators for determining fees billed.

In some embodiments, such fees may be configured for a subset of the complete set of property accounts served by the GMA thus allowing a given fee configuration to apply to an individual property account, an explicit list of property accounts, or a group of property accounts determined for example by a factor or factors such as sub-basin location, groundwater use efficiency, or perhaps alternative water sources. In some embodiments, a WAMP 150 may facilitate a financial incentive program, such as rebates or credits, that may incentivize groundwater sustainability or other desired behaviors by GMA members and/or by third parties.

It may be difficult for potentially competing water management agencies in a groundwater basin to cooperate to form a VGMA. To help overcome such difficulty, in some embodiments, a WAMP 150 may facilitate operating parallel secure billing facilities with a given such facility separately configurable and operable by one of the constituent water management agencies within the VGMA. In this way, the proprietary commercial information of each of the constituent water management agencies may be kept secure and private, but still allow for possible anonymization and aggregation of data to provide basin-wide analytics.

In some embodiments, a WAMP 150 may facilitate a GMA to configure and operate an 'electronic water rights exchange'—i.e., comprehensive water transfer/marketing, planning, management, analytics, monitoring and reporting facilities which may enable more efficient and sustainable management of groundwater resources within a given stressed groundwater basin. Such WAMP 150 facilities may for example enable and facilitate the transfer and/or settlement of water rights between willing buyers and sellers within such a groundwater basin. Access to such an efficient WAMP 150-facilitated electronic water rights exchange may benefit property accounts and property managers with without compromising the sustainability of the basin. Furthermore, such a configurable WAMP 150-facilitated electronic water rights exchange may facilitate a GMA to balance and/or benefit from water efficiency measures within the GMA's managed basin(s)/sub-basin(s). Therefore, a WAMP 150 may facilitate both sustainability managers and property managers in their respective WAMP-user roles to sustainably manage valuable finite groundwater supplies. Dynamic data collection and powerful report generation capabilities integrated with such a WAMP 150 water transfer/marketing facility may additionally enable sustainability managers to make intelligent and informed decisions about short- and long-term water usage within their basins. This may allow sustainability managers and property managers to maximize agricultural output while reducing costs and waste and ensuring the most efficient management and use of scarce groundwater resources.

In some embodiments, a WAMP 150-facilitated electronic water rights exchange may facilitate trading surface water rights in addition to groundwater rights. By facilitating trading of surface water rights and groundwater rights in the same exchange, a WAMP 150 may help lessen depletion of a given groundwater basin by increasing cost-efficient access to alternative water sources and distribution. In addition to a GMA's members benefiting from standardized, trusted and efficient processes for conducting water right transfers, a WAMP 150-facilitated electronic water rights exchange may facilitate a GMA to earn revenue—for example from market transaction fees. Additionally, a WAMP 150-facilitated electronic water rights exchange may enable partnerships with third party financial institutions such that water rights trades may perhaps be financed and/or insured.

In some embodiments, a WAMP 150 may facilitate a GMA to create or facilitate a market for trading water rights including but not limited to: extraction, distribution, storage and/or usage, thereby perhaps promoting more efficient (and perhaps more equitable and sustainable) water utilization. A WAMP 150 may for example provide an electronic water rights exchange facility where water extraction, distribution, storage, usage and/or derivative rights may be optioned, leased, sold or otherwise traded, securitized, capitalized or monetized. Such a WAMP 150-facilitated electronic water rights exchange may facilitate a GMA to configure sustainable trading rules and thereby, for example in California, allow for the activation of the water extraction rights trading powers of the Sustainable Groundwater Management Act. A WAMP 150-facilitated electronic water rights exchange may be configured so as to utilize trading rules that promote groundwater sustainability—for example, limiting the quantities of water that may be traded by a given property account utilizing the exchange. Furthermore, a WAMP 150 may facilitate the GMA to update and uniformly implement changes in policy and sustainable trading rules—for example suspending new groundwater transfers for a sub-basin that may be falling behind against GMA sustainability goals.

A WAMP 150 in some embodiments may be shared by two or more GMAs cooperating as a VGMA. Such a shared WAMP 150 may facilitate a virtual integrated electronic water rights exchange that may in turn facilitate the transfer of water rights within a multi-GMA groundwater basin.

In some embodiments, a WAMP 150 may be configured to facilitate parties outside a GMA's district to utilize the facilities of the GMA's WAMP-150 facilitated electronic water rights exchange. By facilitating the transfer of groundwater not needed within the GMA's district, willing buyers and sellers of water have access to an efficient, cost-effective and impartial marketplace that may permit water to be re-distributed to its highest value end use without compromising the sustainability of the GMA's basin. Such groundwater transfer may be actualized by utilizing existing groundwater distribution systems that may otherwise be fallowed due to regional water shortages.

In some embodiments, a WAMP 150 may facilitate a water trading news (and perhaps more general news) portal. A WAMP 150 may facilitate sustainability managers to access aggregated and perhaps curated information feeds including but not limited to: news, social media, research, and regulatory actions. Additionally, such news and information may be distributed by a WAMP 150 to members, property managers and other interested third parties. Such WAMP-accessed information may therefore assist a GMA and its members to better manage its water resources.

As stated previously, for the purposes of the discussion that follows, when the term 'GMA' is used, it may be assumed unless stated otherwise that the discussion applies equivalently to a VGMA; also the term 'GMA' may be assumed to apply equivalently to a surface water management agency (unless stated otherwise) should such a surface water management agency manage or utilize groundwater resources, or anticipate doing so or cooperating in a VGMA, or for any other reason utilize a WAMP 150.

In some embodiments, a WAMP 150 may facilitate a GMA to configure, operate, and in general in a systematic fashion adopt utilization of that WAMP 150 so as to migrate the GMA away from its current legacy operations system(s) and replace them with the thusly configured facilities of the WAMP 150. A WAMP 150 may facilitate different types of water agencies, including but not limited to:

- a surface water management agency,
- a groundwater management agency (GMA), and
- two or more GMAs (or other water agencies) cooperating in a VGMA.

Specific to the operation of a VGMA, a WAMP 150 may facilitate organizing, assembling and/or operating a VGMA. Such VGMA facilitation may include combining or keeping securely separate (as appropriate) the data, functions and responsibilities of the constituent water management agencies cooperating to form the VGMA so as to eliminate redundant operation while protecting constituent agencies' proprietary/commercial interests and facilitating de-identified aggregated data to be utilized by the VGMA. In turn, this may enable the respective GMAs to provide reports to a government authority to fulfill the requirements of a SGMA. Hence, the thusly WAMP 150-facilitated VGMA may facilitate existing GMAs to maintain their relationships with their members while complying and contributing to the implementation of the SGMA.

In some embodiments, a GMA may utilize its own staff to perform the migration process from the GMA's legacy operations systems to a WAMP 150. Or a GMA may utilize third parties to assist in or to totally perform such a migration process.

In some embodiments, a WAMP 150 may facilitate a systematic phased migration from a legacy operations system to a WAMP 150. In particular, a WAMP 150 may provide a GMA with facilities that educate, prepare and guide the GMA in a step-by-step fashion through such a phased process. For example, a WAMP 150 may provide facilities to import the data inputs and outputs of the legacy operations system (either automatically or if necessary manually) such that those same inputs may be processed by the WAMP 150 and the resulting WAMP 150 outputs may be compared by the WAMP 150 and by the GMA against the outputs of the legacy operations system.

The process of migrating two or more GMAs cooperating in a VGMA from their individual legacy operations systems to a WAMP 150 may be similar to the phased migration process for a single GMA—but typically more complex. A WAMP 150 may facilitate each of the GMAs to migrate their respective operations individually and separately to the WAMP 150 as was described above. As each GMA's migration to the WAMP 150 may be completed, the WAMP 150 may further facilitate that GMA to migrate to a VGMA configuration and operation of that WAMP 150.

Referring to FIG. 2, a WAMP 150 may support a GMA's capacity to innovatively and reliably service members within the GMA's district while installing the reasonable controls necessary for a GMA to manage its operations. The GMA users of a WAMP 150 may be facilitated by the WAMP 150 to cost effectively and efficiently implement groundwater management requirements—for instance those mandated by California's Sustainable Groundwater Management Act.

In some embodiments, a WAMP 150 may include one or more 'facilitators' that may be utilized via user interface(s) to configure, monitor, test, control, manipulate and otherwise operate the user-apparent facilities of a WAMP 150. Such facilitators may integrate, interwork and seamlessly share data with each other and among WAMP 150 facilities. In some embodiments, data created, updated by, or otherwise associated with a given WAMP 150 facility may be accessed, utilized, replicated, modified, aggregated, associated, or otherwise utilized by one or more additional facilitators of a WAMP 150. Furthermore, a given screen display by a WAMP 150 facilitator may include data from one or more facilities of a WAMP 150 or information derived from such data from one or more such facilities. WAMP facilitators may include, but not limited to:

- Water Rights Registry Facilitator (WRRF) 241,
- Relationship Management Facilitator (RMF) 242,
- Basin/sub-basin Reporting Facilitator (BRF) 243,
- Basin/sub-basin Billing Facilitator (BBF) 244,
- Transfer & Market Facilitator (TMF) 245, and Groundwater Management Agency Formation Facilitator (GMAFF) 246.

For example, in some embodiments a Water Rights Registry Facilitator (WRRF) 241 may facilitate recording and updating information pertaining to members' and stakeholders' water rights and related property interests within or related to the jurisdiction of a GMA; a Relationship Management Facilitator (RMF) 242 may facilitate a GMA staying in contact with and providing services to its members; a Basin/sub-basin Reporting Facilitator (BRF) 243 may facilitate regulatory-compliant reporting by a GMA to governing or interested regulatory bodies; a Basin/sub-basin Billing Facilitator (BBF) 244 may facilitate billing for fees such as groundwater usage fees from members or appropriate third parties; a Transfer & Market Facilitator (TMF) 245 may facilitate a GMA providing a WAMP 150-facilitated water rights exchange market where for example options or rights for quantities of water might be offered for sale, negotiated, purchased, and recorded; and a Groundwater Management Agency Formation Facilitator (GMAFF) 246 may facilitate configuring a WAMP 150 and entering, importing and otherwise acquiring data utilized by such a WAMP 150 to facilitate the operation of a water agency such as a GMA, or facilitate the operation of two or more GMAs and/or other water agencies cooperating as a VGMA).

Water Rights Registry Facilitator (WRRF) 241. In some embodiments, a WRRF 241 may be utilized for secure cloud based 'water extraction rights registry' (WER registry) services that may facilitate a GMA to log, monitor, regulate and otherwise manage water use rights. A WRRF 241 may facilitate accumulating, storing, updating and otherwise managing a comprehensive WER registry. Additionally, a WRRF 241 may facilitate a GMA's utilization of secure, auditable process(es) for managing and maintaining records of a WER registry. A GMA (as well as appropriately authorized third parties) may utilize such a WAMP WER registry facilitated by a WRRF 241 as a reliable source of groundwater extraction rights information within the GMA's jurisdiction.

In some embodiments, a sustainability manager may utilize a WRRF 241 to import property location, boundary, and ownership information from appropriate sources such as a county recorder's database. A WRRF 241 may additionally be configured so as to interface and obtain data from third party water-use reporting systems. Imported data along with other WER registry data and data managed by other WAMP 150 facilitators may be aggregated and analyzed to provide an easily comprehensible basin-wide overview of groundwater and/or surface water use.

In some embodiments, a WRRF 241 may facilitate a sustainability manager to retrieve data from an earlier date's WER registry that may have been logged or otherwise recorded by a WAMP 150. Additionally, a WRRF 241 may facilitate a sustainability manager to configure WER registry record access controls for one or more property managers. Such WER registry access controls may for example be configured to include, write only, read and write, read write and edit, approve and overwrite authorization for specific elements of WER registry data including read only access to prior date's WER registries.

Relationship Management Facilitator (RMF) 242. In some embodiments, an RMF 242 may be utilized for secure cloud based member relationship management services that may facilitate a GMA's (or other agency's) sustainability manager to: input, store, access, edit, update, and otherwise process and share (as appropriate) member profile, contact and interaction details including written, electronic and verbal communication with property managers and/or third parties. In some embodiments, a RMF 242 may assign, perhaps automatically, a unique member ID number to each member. Such a member ID number may be then be utilized by a WAMP 150 to search WAMP Database(s) 158 for information pertaining to the member assigned that unique member ID number.

An RMF 242 may facilitate multiple sustainability managers to simultaneously input, store, access, edit, update, and otherwise process and share (as appropriate) a multiplicity of GMA member's water service accounts.

In some embodiments, an RMF 242 may facilitate configuring a WAMP 150 so as to activate or de-activate WAMP 150 services to a given member. Furthermore, a sustainability manager may utilize an RMF 242 to configure a set of secure WAMP 150 facilities that a property manager (or an appropriate third party) may utilize.

An RMF 242 in some embodiments may facilitate a sustainability manager to communicate (e.g., via SMS, email and or voice) with property managers utilizing the member contact facilities of a WAMP 150. Such member contact facilities may include a member-accessible web page and/or a mobile App made available for member's mobile devices.

An RMF 242, in some embodiments, may be utilized by a sustainability manager to add a contact note (or notes) to a member account record—for example preserving details of a conversation. In some embodiments, a RMF 242 may facilitate a sustainability manager to logically "attach" a contact note or other annotation to virtually any type of WAMP Database(s) 158 record. Such a flexible annotation facility may be thought of as the digital equivalent of a post-it note.

In some embodiments of a WAMP 150, an RMF 242 may integrate with corresponding WRRF 241 to provide an integrated interface to facilitate a sustainability manager to access and update a property account's personal and business information including their property water and land assets. Additionally, a sustainability manager may access and update a property manager's personal and business information including their per-property managed water and land assets Such an integrated interface may provide:

- Personal and business data for every water consumer, water provider, and irrigation stakeholder within a basin, and
- A streamlined summary page for the WER registry data for every property account and every property manager.

Basin/sub-basin Reporting Facilitator (BRF) 243. In some embodiments, a BRF 243 may be utilized for secure cloud based report generation and publishing services that may facilitate a GMA to configure and produce custom-tailored reports as well as configuring reporting intervals for a given report and the method in which a given report is to be undertaken (manual or electronic). A BRF 243 may provide a range of sophisticated reporting facilities—allowing the generation of charts, maps and downloads to give sustainability managers instant access to high level aggregated data pertaining to irrigation per property account in their groundwater basin.

In some embodiments, a BRF 243 may facilitate a GMA to create and report upon a groundwater sustainability plan (GSP) that may be specific to that GMA's jurisdiction. Furthermore, a BRF 243 may facilitate a GMA to cooperate with one or more additional GMAs to produce a single basin-wide GSP. A WAMP 150-facilitated VGMA may simplify and speed such GMA cooperation to produce and report out such a GSP. Additionally, a BRF 243 may facilitate a GMA or cooperating GMAs or VGMA to report a GSP and subsequent changes thereto to the appropriate overseeing government regulatory agency(s). In states such as California, such a reported GSP may be basin-wide reflecting the cooperation of GMAs within that basin.

In some embodiments, a GSP may be created and/or revised external to the WAMP 150. Any sustainability requirements derived from such an external GSP may be imported to the WAMP 150.

In some embodiments, a BRF 243 may facilitate a GMA to accumulate all data relevant to monitoring the GMA's performance relative to the GSP. Furthermore, a BRF 243 may be configured to generate corresponding sustainability reports and communicate such reports to the appropriate government regulatory authorities—thusly showing them how the GMA (or cooperating GMAs) are performing against their GSP.

In some embodiments, a BRF 243 may facilitate a sustainability manager to produce unique district-specific or basin-specific groundwater analytics reports. A sustainability manager may be further facilitated by numerous display options of a BRF 243 including: charts, diagrams and annotated maps—thus providing instant access to aggregated and analyzed data with granularity options ranging from basin-wide down to per property account. Additionally, a BRF 243 may facilitate a sustainability manager to configure reporting intervals as well as the method in which a given report is to be undertaken (physical or electronic). BRF 243 reporting facilities may also be configured to distribute reports for a limited time or to a proscribed list of distributees.

In some embodiments, BRF 243 groundwater analytics reports may assist GMA sustainability managers and/or their property managers counterparts with future business planning. For example, a BRF 243 may interwork with a TMF 245 to facilitate reporting on water market trends within the GMA's basin, but also potentially regionally, nationally and/or world-wide.

In some embodiments, a sustainability manager may utilize a BRF 243 hundreds of times a day to generate reports. Some such reports might be as simple as a table with one or a few entries. Other BRF 243-facilitated reports may be much longer and more complex and in some embodiments may even include active display elements such as XML. Additionally, a sustainability manager may utilize the facilities of a BRF 243 to save a record of a BRF 243-facilitated report and make it accessible so it may be shared with others—i.e., to publish the report. In some instances, a report may be published in a relatively passive fashion. For example, it may be posted on a GMA members web site or provided to a government agency. Or it may simply be archived perhaps with a quick added annotation by the sustainability manager.

In some embodiments, a BRF 243 may archive some or all reports generated by the BRF 243. So for example, a sustainability manager may browse through the archive for the previous day to find an interesting crop distribution pie chart he glimpsed. Finding the report with that pie chart, the sustainability manager may then publish the report containing that pie chart or perhaps publish just the pie chart as a mini-report in order to share it with colleagues or with third parties as appropriate. In this fashion, a BRF 243 may augment a sustainability manager's memory and knowledge and perhaps provide an ex-post facto means to publish a report that would otherwise be lost or need to be regenerated or recreated based on the sustainability manager's recollection.

Basin/sub-basin Billing Facilitator (BBF) 244. In some embodiments, a BBF 244 may be utilized for secure cloud based member (and appropriate third parties) bill generation, distribution, analysis, accounting and payment services that may facilitate a sustainability manager to configure and operate the billing facilities of a GMA's WAMP 150 (e.g., calculate fees, send invoices, track and facilitate payments and export data to external systems and applications such as a variety of accounting software packages.) A BBF 244 may facilitate a sustainability manager to configure a WAMP 150 to calculate and charge: a fixed fee, fee per acre foot, tiered fee, (or a mix of) on an individual member or on a basin/sub-basin wide level. A BBF 244 may for example facilitate configuring the billing criteria utilized for fee determination including but not limited to: landholdings, water use and water rights. A sustainability manager may also be facilitated in custom configuring the application of fees—for instance: to an individual property account, an explicit list of property accounts, or a group of property accounts. Additionally, a BBF 244 may facilitate a sustainability manager to obtain reports on account status and performance as well as other billing analytics that may for instance facilitate forecasting water demand and revenue based perhaps in part on historical trends.

Furthermore, in some embodiments, a BBF 244 may be utilized by a GMA to assemble payment information, distribute invoices and collect payments, as well as notify and track the entire billing process (e.g., accounts receivable aging, cash received, etc.). The sustainability manager may also configure invoices to be sent out by a WAMP 150 either electronically or via paper mail or perhaps both.

In some instances, different areas within a GMA's district may utilize water from differing sources and perhaps with differing costs to the GMA or differing impacts on groundwater sustainability. Therefore, in some embodiments, Water Accounter 266 may facilitate a GMA to configure a 'billing area' such that a groundwater extractor and/or water consumer in a given billing area may be invoiced utilizing different billing rates and/or fees than in another such billing area. Furthermore, the WAMP 150 'boundary mapping tool' may be utilized to configure the geographical boundaries of a given billing area. Such a boundary mapping tool may facilitate a sustainability manager to place virtual pins on a map image of the district or a portion of the district, where straight virtual lines between virtual pins represent segments of the area boundary. Should a more jagged boundary need to be drawn, an additional virtual pin may be placed along an existing virtual line and then that virtual pin may be "dragged and dropped" to a new map location, stretching and redrawing the straight line segments on each side of the newly added and moved virtual pin. The process may be repeated with additional virtual pins for numerous zigs and zags. Such a technique for placing and modifying "rubber band lines" to create a complex outline may be familiar to one skilled in the art. In some embodiments, a WAMP 150 may integrate and utilize third party-sourced boundary drawing facilities.

Additionally, subsequent to configuring the boundaries of a billing area, in some embodiments, a sustainability manager may utilize a BBF 244 to create a new billing line, enter in the appropriate billing rate(s) and/or fee(s) and attached the billing line to the billing area.

Transfer & Market Facilitator (TMF) 245. In some embodiments, a TMF 245 may be utilized for secure cloud based water rights exchange management services that may facilitate a GMA to configure, monitor, and operate a WAMP 150-facilitated electronic water rights exchange.

Utilizing a TMF 245, a sustainability manager may for example configure the trade offering categories and classes of such a WAMP 150-facilitated water rights exchange. Configurable trading categories may include, but not be limited to: extraction, distribution, storage, usage, securitized and/or derivative rights. Configurable trading classes may include but not be limited to: options, leases, conservation credits, sales and swaps.

In some embodiments, a TMF 245 may facilitate a sustainability manager to configure a WAMP 150-facilitated water rights exchange to automatically update the GMA's WER registry to reflect trades made via the exchange. Additionally, a TMF 245 may facilitate a GMA configurable external user interface (perhaps web-based and/or mobile app based) for property managers and possibly other third parties such as water brokers to access and utilize the exchange.

In some embodiments, a TMF 245 may facilitate a sustainability manager to monitor the operation of a WAMP 150-facilitated electronic water rights exchange. Additionally a TMF 245 may be configured to monitor external markets. In addition to configuring market analytics and reports, a sustainability manager may configure a TMF 245 to provide notifications and alerts when a monitored event or events occur.

Additionally, in some embodiments a TMF 245 may facilitate a sustainability manager to manually manage the operation of the WAMP 150-facilitated electronic water rights exchange. For example, a sustainability manager may utilize facilities of the TMF 245 to shut down the exchange due to an emergency, tragedy or disaster—e.g., an earthquake resulting in an aqueduct breach.

Furthermore, in some embodiments, a TMF 245 may be configured to facilitate interworking of a GMA's WAMP 150-facilitated electronic water rights exchange with other GMA's WAMP 150 water rights exchanges. Additionally, a sustainability manager may configure a TMF 245 to facilitate interoperation with third party water/commodity exchanges.

Groundwater Management Agency Formation Facilitator (GMAFF) 246. In some embodiments, a GMAFF 246 may be utilized for secure cloud based WAMP 150-bring-up and management services that may facilitate a GMA to plan for, configure, operate, evaluate, upgrade, and in general adopt utilization of a WAMP 150 so as to migrate that GMA away from its current legacy operations systems and replace them with the thusly configured, data populated and tested facilities of a WAMP 150. A GMAFF 246 may for example facilitate phased planning, configuration, operation and testing of a GMA's migration to a WAMP 150 by facilitating a comprehensive checklist and progress reporting system to allow tracking of and enhanced confidence in the migration process facilitated by the WAMP 150. A GMAFF 246 may support different types of water agencies, including but not limited to:

- a surface water management agency,
- a groundwater management agency (GMA), and
- two or more GMAs (or other water management agencies) cooperating in a VGMA.

A GMAFF 246 in some embodiments may facilitate a GMA and its sustainability manager(s) to study, plan for, prepare for, and undertake migration from the GMA's legacy operations systems to a WAMP 150. A GMAFF 246 may for example facilitate migration planning by providing on-line training, visualization aids, printing of manuals, pamphlets, quick guides, check lists and other documentation. Such planning facilitation and documentation may help to prepare both GMA staff and GMA members for the migration to a WAMP 150.

Additionally, in some embodiments, a GMAFF 246 may facilitate a GMA to configure a GMA user account individually for each sustainability manager—with privileges and access controls controlling which WAMP 150 facilities a given sustainability manager may access and utilize. Similarly, a GMAFF 246 may facilitate a GMA to configure data access controls for WAMP Database(s) 158 records on a per-sustainability-manager basis. So for example, a GMA may configure WER registry record access controls to various privileges to include: no access, write only (i.e., new records only), read and write, read write and edit, approve and overwrite authorization for specific elements of WER registry data as well as controlling read only access to prior date's WER registries.

In some embodiments, a sustainability manager of a GMA may utilize a GMAFF 246 to configure facilities of a WAMP 150 that the GMA may be in the process of migrating to. The process of initially configuring such facilities may result in a GMAFF 246 generating checklist(s) and documentation that the sustainability manager may utilize to guide and monitor the migration process. As the sustainability manager further utilizes the GMAFF 246 to configure facilities of a WAMP 150, additional checklist(s) and documentation may be generated by the GMAFF 246. So for example, such a GMAFF 246 may be utilized to guide the sustainability manager step-wise through a phased process of planning, configuring, inputting data to, operating, testing and evaluating operation of the WAMP 150. Additionally, a GMAFF 246 may facilitate a GMA to generate migration plans, and subsequently back-annotate those plans to provide a record of the decision making and process outcomes and insights.

A GMAFF 246 may facilitate the constituent water agencies of a VGMA to migrate from their legacy operations systems to a WAMP 150. For example, each GMA may separately migrate its own operations to the WAMP 150 and having successfully done so may utilize a GMAFF 246 to cooperatively integrate each GMA's operations with the operations of the other constituent GMAs so as to effectively and successfully assemble and migrate the operations of the constituent GMAs to VGMA facilitated by the WAMP 150.

In some instances, one or more WAMP 150 facilitators 241-246 may be embodied as a web application(s) or native application(s) that may execute on a WMAP 150 user's terminal device.

Referring further to FIG. 2, in some embodiments, WAMP database(s) 158 may include, but not be limited to:

- Jurisdiction and Rights Database 291,
- User Database 292,
- Resource and Physical Plant Database 293,
- Weather and Climate Database 294, and
- Workflow Database 295.

In some embodiments, Jurisdiction and Rights Database 291 may function as a reliable depository for information pertaining to a GMA district and properties within that GMA district, e.g., property accounts including historical, deeded, optioned, leased, purchased or otherwise granted, awarded, claimed or otherwise acquired groundwater and/or surface water rights and interests.

In some embodiments, User Database 292 may function as a reliable depository for information pertaining to a GMA district and members and non-member users within the GMA district, e.g., property owners, property managers, the GMA's sustainability managers, third party data providers and consumers.

In some embodiments, Resource and Physical Plant Database 293 may function as a reliable depository for inventory records of water resources and physical plant utilized for the pumping, storage, measurement (including Sensor(s) 130) and distribution of water resources. Additionally, Resource and Physical Plant Database 293 may store measurements and other data related to water resources and physical plant, e.g., 3-D maps, satellite images, well sample results and other water resource measurements, including estimated volume, flow rates, utilization, accessibility, and recharge and depletion rates.

In some embodiments, Weather and Climate Database 294 may function as a reliable depository for information pertaining to weather and climate—both current year and longer term, e.g., measurements, statistics, history, projections and models.

In some embodiments, Workflow Database 295 may function as a reliable depository for information pertaining to day-to-day operation of a GMA—particularly the work tasks of sustainability managers—including schedules of future activities, records of ongoing activities and contacts, and archival logs of completed activities and contacts.

In some embodiments, a WAMP 150 may include one or more WAMP facilities. Such WAMP 150 facilities may integrate, interwork and seamlessly share data with each other and also with WAMP 150 facilitators 241-246. A WAMP 150 facilitator 241-246 may utilize and perhaps display data from one or more facilities of a WAMP 150. WAMP 150 facilities may include facility logic and/or control data/metadata related for example to configuring, maintaining and utilizing the WAMP database(s) 158. WAMP 150 facilities may include, but not limited to:

- Stakeholder Associator 262,
- Resource Monitor 264,
- Water Accounter 266,
- Water Marketer 268, and
- Activity Manager 269.

In some embodiments, Stakeholder Associator 262 may function as associative and analytic nexus for data relating to a GMA's stakeholders. Stakeholder Associator 262 may utilize one or more of WAMP Database(s) 158. Stakeholder Associator 262 may facilitate services provided to or otherwise related to the stakeholders of a GMA where such services may be made apparent to a WAMP 150 user via WAMP 150 facilitator(s) 241-246. As discussed previously, a GMA's stakeholders may include, but not be limited to:

- The GMA including sustainability managers,
- GMA district members—e.g., property owners and property managers,
- Surface water rights holders,
- Surface water management agencies,
- Non-agricultural water consumers and their water agencies,
- Groundwater recharge area property owners,
- Local politicians and/or government officials,
- Sovereign entities such as Native American reservations,
- Neighboring GMAs,
- State/provincial and national agriculture, water and environmental agencies,
- Regional watershed management agencies,
- Regional water storage and distribution agencies (e.g., Bureau of Reclamation, California Department of Water Resources),
- Water brokers,
- Non-agricultural large scale water consumers,
- Non-local non-agricultural water consumers (e.g., large city dwellers),
- Geothermal power producers,
- Politicians, government officials, lobbyists, scientists, cartographers,
- Non-governmental organizations,
- Irrigation industry service and equipment vendors,
- Water and beverage bottling companies,
- Right of way holders, and
- Neighboring geo-political entities (e.g., cities, states, provinces and countries).

Clearly, a GMA may have many more stakeholders than just the GMA district members, property owners and property managers. It is important to a GMA that a WAMP 150 offer appropriate facilities reflecting, managing, and as utilized, catering to the interests of a multiplicity of stakeholder types. In some embodiments, Stakeholder Associator 262 may be utilized by a WAMP 150 to determine a given user's stakeholder type and therefore what facilities (as may be further constrained by configuration) may be appropriate for utilization by that given user. Stakeholder Associator 262 may facilitate a sustainability manager to record in the WAMP 150 database(s) 158 relevant contact information for members, and to associate selected subsets of members so as to facilitate external communication or internal reporting, and track all communication (internal and external) with or about a member (via e-mail, phone calls or in person). Additionally, Stakeholder Associator 262 may utilize User Database 292, Workflow Database 295, Jurisdiction and Rights Database 291 (and perhaps to a lesser extent Resource and Physical Plant Database 293 and Weather and Climate Database 294) to determine stakeholders, their stakeholder type and various other sorts of stakeholder characteristics and service requirements.

In some embodiments, facilitating communication and good working relations with a GMA's many stakeholders may be further facilitated by Stakeholder Associator 262. A GMA may for example utilize a WAMP 150 to provide numerous reports and notifications to GMA stakeholders. However, whether or not a given stakeholder may be provided a specific report or notification may be determined by the type of stakeholder. For example, a notice of a water fee rate increase may be sent to GMA members, but not to neighboring GMAs. Stakeholder Associator 262 may for example facilitate such automated determinations based on stakeholder type.

Stakeholder Associator 262 in some embodiments may be utilized to configure and subsequently determine—based on a given stakeholder's characteristics—what WAMP facilities and/or data that given stakeholder's network access account may utilize. Such a determination may perhaps facilitate safeguard(s) against accidental mis-granting of access to sensitive WAMP 150 facilities and/or data.

A property account within a GMA's district may have more than one property manager user—for instance, the owner of the property in addition to an individual or firm hired by the property owner. In some embodiments, Stakeholder Associator 262 may facilitate a GMA to configure shared network access for such 'joint property managers'. Stakeholder Associator 262 may for example facilitate each such joint property manager user to have their own WAMP 150 log-in credentials—e.g., unique user name and password—and yet associate them with the same property account. Or perhaps a given property account's network access may have a single user name for that property, but separate passwords for each joint property manager user for that property.

Furthermore, a GMA member may own (or co-own) more than one property within the jurisdiction of the GMA. In some embodiments, Stakeholder Associator 262 may facilitate a GMA member to have a 'property manager master account' such that that GMA member may manage one or more 'property manager auxiliary account(s)' for use for example by an individual or firm authorized by the GMA member to manage aspects—perhaps configurable—of the GMA member's business dealings with the GMA relative to a given property. Additionally, in some embodiments, a GMA member owning (or co-owning) more than one property within the jurisdiction of the GMA may be facilitated by Stakeholder Associator 262 to have their own GMA-configured property manager auxiliary account for each property within the jurisdiction of the GMA. In some instances, such a multi-property owner might 'switch' from one property manager auxiliary account to another via a Stakeholder Associator 262-facilitated WAMP 150 menu. Perhaps an account specific log-in may be required for such a property manager auxiliary account switch or perhaps more conveniently such a property manager master account user may make such a switch without an additional log-in to the WAMP 150.

Furthermore, an individual or firm may act as property manager for two or more properties where the ownership of two or more of those properties may be separate or disjoint. So for example, ABC Property Management may work for both Aiello Family Vineyards and Fujimoto Kobe Beef. Accordingly, in some embodiments ABC Property Management may have separate WAMP 150 user names and passwords for Aiello and for Fujimoto—facilitated by Stakeholder Associator 262. Alternatively perhaps, ABC Property may have a single Stakeholder Associator 262-facilitated user name and password and then a WAMP 150 menu of authorized properties where each such authority has been pre-ok'd (again facilitated by Stakeholder Associator 262) from the master account for the corresponding property.

In some embodiments, Stakeholder Associator 262 may facilitate a GMA to associate one or more persons and/or legal entities—utilizing a WAMP 150 grouping abstraction for those persons/legal entities. Typically, such a grouping abstraction may be utilized because those persons/legal entities have something in common—perhaps they all grow crops adjacent to an irrigation canal. Or that something in common may for instance be a legally recognized relationship such as marriage or a business contract. A WAMP 150 may utilize a grouping abstraction as if it were an individual, such that facilities of a WAMP 150 utilized for an individual may be similarly utilized for those grouped together by a grouping abstraction.

So for example in some embodiments, Stakeholder Associator 262 may facilitate a sustainability manager to group several property owners into a so called 'property group' and assign that property group a unique group name and perhaps also a unique nickname (i.e., a name that is typically short, easy to remember and/or easy to spell.) Such a property group may then be utilized by a WAMP 150, as appropriate, as if it were an individual property owner. So for example, a sustainability manager may group twenty property owners that have a grape growing co-op. She may group name the group "Sheldon Valley Grape Co-op" and nickname it "SV grapes". Further by example, the sustainability manager may utilize a WAMP 150 to generate a water utilization forecast report entering in the name Sheldon Valley Grape Co-op rather than each of the individual property owners' names. A WAMP 150 may correspondingly generate a forecast report for the grouped properties as if they were a single property. Furthermore, in some embodiments, the WAMP 150 may additionally generate a forecast report individually for each of the constituent properties in the property group. The way(s) in which a property group or other grouping abstraction may be utilized by a WAMP 150 may vary based on configuration of that WAMP 150.

In some embodiments, Stakeholder Associator 262 may facilitate operations of a GMA with thousands of data records pertaining to members, their properties, their water extraction rights and numerous other member (and/or third party) related things. Selecting a specific WAMP Database(s) 158 record may be a daunting task for a sustainability manager (or other WAMP 150 user), therefore Stakeholder Associator 262 may provide a "quick search" facility to assist in easing such selection. So for example, Stakeholder Associator 262 may facilitate a sustainability manager to search for a record by typing in one or more entry fields in a search input array, where each input field may be utilized by a WAMP 150 as a search key—either independently and/or in concert. Stakeholder Associator 262 may facilitate quick search wherein a list of multiple search results may be presented to a sustainability manager—each as a clickable link—and the sustainability manager may select one by clicking on it. Such a list may have ranked ordering based on the quality of the match and other considerations. In some instances, a WAMP 150 may be utilized to attempt a perfect search match and should no match occur and therefore no corresponding data record be retrieved, a WAMP 150 may facilitate a sustainability manager to create a new data record. In some embodiments, a WAMP 150 may integrate and utilize third party-sourced search facilities.

In some embodiments, Stakeholder Associator 262 may facilitate utilizing geographic subdivisions to configure a district into one or more 'zone(s)'. Such zone-based subdivision of a GMA's district may for example simplify and speed record searches by narrowing them to a smaller geographic area. Sustainability managers—just as the average person—may have an easier time remembering the region that a property is located in rather than the street name or exact address. Therefore, Stakeholder Associator 262 may be utilized to subdivide a district into geographic zones with each such zone uniquely named. Such subdivision may be facilitated for example by utilizing hydrological features such as sub-basins or by utilizing existing third party subdivisions such as political zoning. In some instances, Stakeholder Associator 262 may import political zone boundary description data from a third party organization such as a county government.

In some embodiments, Stakeholder Associator 262 may facilitate a sustainability manager to create new zones utilizing a WAMP 150 boundary mapping tool—for example outlining a geographic area for such a new zone on a district map. In addition to creating named zones within a GMA, such a WAMP 150 boundary mapping tool in some embodiments may be utilized by a sustainability manager as a visual search tool. So for example, the boundary mapping tool may be utilized to identify a property or properties outlined in whole or in part by the sustainability manager. Additionally, in such a map assisted search mode, a WAMP 150 boundary mapping tool may cause a boundary outline to "snap" to the boundary of enclosed the property (or enclosed adjacent properties). Furthermore, such a WAMP 150 boundary mapping tool facility for selecting a property or properties may utilized by a sustainability manager to designate a property group. Additionally, where appropriate, a WAMP 150 boundary mapping facility may be utilized to redraw a property parcel boundary on WAMP 150 parcel maps of the GMA's district.

In some embodiments, Stakeholder Associator 262 may facilitate a sustainability manager to record in and make updates to WAMP Database(s) 158 capturing the potentially complex and manifold legal relationships impacting ownership of, control of, and/or interest in property and/or water extraction rights. In perhaps the simplest instance a property owner in a GMA's district may also own the ground water extraction rights associated with that property. However, ownership and/or control of the two different rights may be split between parties. For example, a home owner may have title to the property his house is situated on, but a corporation may hold extractive rights including ground water extraction rights. As well as a split in ownership between property rights and groundwater extraction rights, Stakeholder Associator 262 may be configured to capture and track shared rights. A simple case is joint ownership. For example, a married couple may share rights as tenants in common. Or, partners in a business—say siblings—may share rights as tenants in common. Additionally, non-owner third parties may have effective control over property rights and/or groundwater extraction rights. For example, the executor or a trustee may control such rights while the ownership is held in trust or passes between owners. Or a court may enjoin control of such rights, say in a divorce, bankruptcy or perhaps a criminal case. Additionally, a property owner who may also hold the groundwater extraction rights may lease the property to a farmer who may pump groundwater to irrigate crops. Technically that farmer may not hold either the property or the groundwater extraction rights, but the farmer may have a clear cut interest in those rights and in management of groundwater extraction by a GMA. Stakeholder Associator 262 may facilitate a GMA to capture, record and revise any and all of the above described variations on rights ownership and interests.

Consequently, in some embodiments, Stakeholder Associator 262 may be configured to record in and make updates to WAMP Database(s) 158 capturing the relationships between rights owners and other potential interest holders so that all may be served fairly, and as may be required by legal statutes and mandates in force in the GMA's district. Changes in ownership rights and or interests may require corresponding changes in WAMP Database(s) 158 including both Jurisdictions and Rights Database 291 (e.g., WER registry) and User Database 292.

More specifically to VGMAs, many constituent GMAs (as well as surface water management agencies joining in VGMAs) may have financial and commercial disincentives to share data or relationships—particularly when they overlap in watersheds and or groundwater basins. However, Stakeholder Associator 262 may facilitate formation and operation of a VGMA—combining, but appropriately firewalling data from multiple water management agencies cooperating as a seemingly single VGMA.

In some embodiments, Stakeholder Associator 262 may utilize a 'shared data access control engine' capability with configurable rules to enforce how GMAs' shared data is accessed, copied, anonymized, aggregated, communicated and secured. Such rules may for example be configured and managed by a third party consultant employed by the GMAs under the auspices of the VGMA. Such a shared data access control engine capability may enable multiple GMAs to share the facilities of a WAMP 150, while protecting the privacy of individual property accounts within a given GMA's specific district and still enabling anonymized aggregated data to be appropriately utilized by the VGMA. So for example, for a WAMP 150 shared by two or more GMAs cooperating as a VGMA, Stakeholder Associator 262 may utilize the shared data access control engine capability to synthesize a virtual VGMA-wide WER registry by appropriately accessing the WER registries of each of the constituent GMAs; or perhaps to assemble a VGMA WER registry by appropriately anonymizing, filtering and combining data from those GMA WER registries.

Referring to FIG. 3, logic flow diagram 300 illustrates an embodiment of a WAMP 150 shared data access control engine. Referring to step 301, the WAMP 150 may facilitate a GMA to configure rules for automatically determining if a given data record element is public or private. A given data record may contain one or more data record elements. A data record element is indivisible into smaller components such that one component may be public and one private.

Referring to step 303, the WAMP 150 may facilitate the GMA to configure rules for determining whether a data record element may be published. Typically, the minimum requirement for publishing a data record element may be that that data record element is determined to be public. Such a data record element once published may be utilized as deemed appropriate by the GMA. For example, a published data record element may be shared—without being anonymized—between GMAs within a VGMA.

Referring to step 305, the WAMP 150 may facilitate the GMA to acquire a new data record to be analyzed by the WAMP 150. Such a data record may for example be so analyzed at the time such a data record is newly acquired as well as each time such a data record is updated.

Referring to step 307, the WAMP 150 may facilitate the GMA to distinguish a newly acquired data record from an update to an existing data record previously acquired by the GMA and stored for instance in the WAMP database(s) 158. Typically a given data record may contain one or more data record elements which when examined together may uniquely identify a data record—i.e., commonly referred to as a record identifier. For example, such a record identifier may be a unique numeric value such as a member ID number. Furthermore, typically such a record identifier may be read-only—i.e., protected from being over-written with a new value (other than perhaps to delete the entire data record).

Referring to step 309, for a data record that is determined to be newly acquired, the WAMP 150 may facilitate the GMA to create a WAMP 150 access control log corresponding to that data record. Such an access control log may contain fields for information corresponding to each data record element within that data record, in which may be recorded, for example, when the data record element was most recently updated (e.g., a time/date stamp) and whether it was determined by the WAMP 150 to be public or to be private.

Referring to step 311, for each data record—whether an update to an existing data record or newly acquired—the WAMP 150 may facilitate the GMA to add a fresh log entry for that data record and for each record element found in it. (Consequently, each time an update to the data record is acquired an additional log entry may be added such that the log may grow larger with more entries over time).

So for example, the fresh log entry may record the source of the data record (e.g., country recorder's database), a time/date stamp for the update, whether or not the source was a public source (i.e., making the entire data record potentially public). Furthermore, a WAMP 150 may optionally be configured by the GMA to place a copy of a given data record in the corresponding entry in the access control log.

Referring to step 313, the WAMP 150 may facilitate the GMA to utilize "public or private" decision rules to log each data record element in the data record as public or private. So for example, one such rule may be that a data record element that is unchanged and previously public shall remain public even if the source of the data record update may be a private one. In this way, each of the data record elements may have its own record of determinations of being public or private. Therefore, a data record may contain both public and private data record elements; and a given data record element may change from private to public and/or public to private over time with successive updates to the data record containing that data record element.

Referring to step 315, the WAMP 150 may facilitate the GMA utilize rules for determining whether to publish a data record element. So for example, one such rule may be that a data record element even if public may not be published if the data record contains one or more private data record elements.

Referring to step 317, the WAMP 150 may facilitate the GMA to distinguish a data record determined to contain a newly publishable data record element from a data record determined not to contain a newly publishable data record element.

Referring to step 319, for a data record that is determined to contain a newly publishable data record element, the WAMP 150 may facilitate the GMA to publish—at the GMA' discretion—each data record element newly determined to be publishable.

Whether or not a data record that is determined to contain a newly publishable data record element, the process may continue at step 305.

In some embodiments, for a given data record element stored in WAMP Database(s) 158 or otherwise stored within a WAMP 150, such a data record element may be secured utilizing encryption and/or other means of security regardless of whether that data record element may be determined to be public, to be publishable, or to be published.

Referring back again to FIG. 2, in some embodiments, Resource Monitor 264 may function as associative and analytic nexus for data relating to a GMA's water resources—i.e., groundwater in particular, but also possibly surface water—and relating to Sensor(s) 130. Resource Monitor 264 may utilize one or more of WAMP Database(s) 158. Resource Monitor 264 may facilitate services related to water utilization within a GMA's district where such services may be made apparent to a WAMP 150 user via WAMP 150 facilitator(s) 241-246.

Resource Monitor 264 may utilize Resource and Physical Plant Database 293, Jurisdiction and Rights Data-base 291, User Database 292 and Weather and Climate Database 294 to determine water availability, distribution, utilization, loss, quality and other water-resource related characteristics for a given GMA district property or member.

As indicated previously, private access to and depletion of groundwater goes largely unmeasured, unmetered and unregulated. This clearly presents a key challenge to a GMA's sustainability mandate. Resource Monitor 264 may facilitate a GMA to locate, monitor, measure, charge fees for, and/or otherwise regulate and limit extraction of groundwater-both private and public.

In order to locate groundwater extraction, in some embodiments a WAMP 150 may utilize Resource Monitor 264. In addition to utilizing WAMP Database(s) 158 such as Resource and Physical Plant Database 293, Resource Monitor 264 may access External Database(s) 170 including but not limited to: local government records of permits for drilling wells, private well drilling and service company records, as well as insurance, loan, title, credit bureau and other "big data" sources as pertain to water wells, well equipment, well services and power run well pumps. Additionally, Resource Monitor 264 may utilize state and national governmental databases—i.e., data identifying wells derived from image analysis of satellite and aerial imagery or from sources similar to those listed above. Furthermore, as Resource Monitor 264 acquires and analyzes such External Database(s) 170-sourced data, it may update the GMA's Resource and Physical Plant Database 293 to record the location of groundwater wells in the GMA's district.

Furthermore, for a given well, additional well-related information may be acquired, correlated and recorded by Resource Monitor 264 in the Resource and Physical Plant Database 293 and/or other WAMP Database(s) 158. Such additional well-related information may include: ownership, well permit status, well drilling company, property water rights, well age, well depth, well bore size, well continuous-pumping capacity, well water level history, pump location (submerged or groundlevel), pump horsepower rating, source of pump power (e.g., generator, solar or line power), associated storage of extracted ground-water (e.g., water storage ponds or tanks), sharing or distribution of extracted groundwater (e.g., water cooperative) and property or properties served by the extracted ground-water. A GMA's Resource and Physical Plant Database 293 may contain such data for planned, active and decommissioned wells.

Additionally, in some embodiments a WAMP 150 may utilize Resource Monitor 264 to monitor groundwater extraction and utilization. So for example Resource Monitor 264 may access External Database(s) 170 such as those of public water extractors. For example, a state college may operate a well or wells and make available recorded measures of such groundwater extraction. Large private institutions may also provide similar groundwater extraction measurement data. Such public and large private institutions may in many instances have the largest number of wells per property with the largest diameter, deepest bores and highest capacity pumps. Such data may provide a GMA an accurate measure of groundwater extraction for that fraction (i.e., public and large private) of overall groundwater basin utilization. Additionally, by acquiring, analyzing and recording historical groundwater data, Resource Monitor 264 may derive a model of prior groundwater capacity and extraction and similarly synthesize a model(s) that may be utilized to estimate and forecast future groundwater capacity and extraction.

In some embodiments, Resource Monitor 264 may utilize telemetry facilities to communicate with Sensor(s) 130 so as to configure, control and acquire data from such Sensor(s) 130 with which to further populate WAMP Database(s) 158. Utilizing increasingly common geo-location facilities incorporated in sensor devices, a WAMP 150 may integrate sensor sourced data with map displays indicating the geographic location of the corresponding Sensor(s) 130. Such Sensor(s) 130 may be mobile such that their position changes over time. Resource Monitor 264 may facilitate moving such mobile Sensor(s) 130—e.g., a miniature drone aircraft—from location to location. In some embodiments, mobile Sensor(s) 130 may be semi- or fully autonomous. Time stamping and geo-location information may perhaps be acquired, may be mixed with sensor data, by Resource Monitor 264. In some embodiments, Resource Monitor 264 may correlate acquired data from a plurality of Sensor(s) 130 so as to synthesize a "virtual sensor" of larger scope (and perhaps capability) than any one individual Sensor 130.

In some instances, WAMP 150-acquired measurement data may be statistically sufficient to support modeling by Resource Monitor 264 that is credibly indicative of overall groundwater capacity and amounts of extraction. However, in GMA districts with a preponderance of private wells—e.g., in rural/agricultural areas, such WAMP 150-acquired measurement data may not be statistically sufficient—perhaps because the statistical sample size is just too small. Therefore, in such GMA districts, a WAMP 150 may utilize Resource Monitor 264 to derive measures of private well groundwater extraction. In some instances, physical meters (i.e., Sensor(s) 130) may be attached to private wells and the corresponding usage data imported to the GMA's WAMP Database(s) 158. However, adding meters to wells may be a slow process—hampered by political resistance as well as practical issues of complexity and cost. One need only consider attempts to meter water use of previously unmetered residential water users to get an idea of how difficult and time consuming such a meter retro-fit may be. Consequently, Resource Monitor 264 may utilize an 'imputation engine' capability (not shown) to derive (rather than physically meter) a measure of water extraction by an unmetered well (or group of unmetered wells). Such an imputation engine capability may be utilized by a GMA to either augment or to totally replace the requirement and cost of installing, maintaining and reading physical meters.

A WAMP 150 imputation engine may utilize numerous 'imputation factors' (e.g., computational variables or constants) to derive measurements of a groundwater extraction and/or consumption related to a specific well (or group of wells). Such imputation factors may in part be sourced as data from Sensor(s) 130, External Database(s) 170 and WAMP Database(s) 158. In some embodiments, a WAMP 150 may calibrate and otherwise verify the reliability of imputation engine derived measurements by measuring one or more 'imputation verification wells' with both physical meters and the derived measurement of the WAMP 150 imputation engine. By utilizing imputation verification wells in hydrologically differing areas throughout a GMA's district, a WAMP 150 may be utilized to judge and tune the weighting of a given imputation factor and thereby improve the accuracy of an imputation engine and refine its derived measurements to best suit that particular GMA district. The results of comparisons of imputation verification wells meter readings and imputation engine derived measurements may be recorded in WAMP Database(s) 150 and shared as appropriate with regulators, GMA members and other district stakeholders and thereby build community experience and trust with the GMA and the WAMP 150.

In some embodiments, an imputational factors utilized by a WAMP 150 imputation engine may include but not be limited to:

- Evapotranspiration:
  - Evapotranspiration data for specific crops in different geographical areas. Note that evapotranspiration data are published and readily accessible by one skilled in the art of agriculture and/or climatology,
  - Crops (type) planted at each property,
  - Density of plantings per acre (estimated, measured or member reported) for each property,
  - Total area of plantings of a given density,
  - Area of bare or fallow land (which generally may have a very different evapotranspiration rate)
  - Age of trees and plantings (younger growing trees may have different evapotranspiration rates relative to mature trees)
- Weather including:
  - Precipitation,
  - Humidity,
  - Wind,
  - Temperature,
  - Sunshine hours,
  - Evaporation (often measured in mm/inches, calculated as the drop in level of standing water in sunshine due to evaporation)
- Any evaporation/evapotranspiration mitigation, including greenhouses, indoor hydroponics, and plastic covers (e.g., for ground crops such as strawberries)
- Irrigation type:
  - Above ground drip,
  - Sprinkler,
  - Flood,
  - Hydroponic,
  - Underground drip.
- Soil type:
  - Clay
  - Sandy
  - Loam
  - Combination of the above types.
- Soil moisture/salinity (monitoring devices may measure the water in the soil and also the salinity.) Generally, if the soil is salty, then plants typically need to absorb and transpirate more water)
- Surface water delivered (e.g., rivers, canals and pipelines)
- As needed, farm channel water loss (more applicable when the channels are not adjacent to the crops, since water from adjacent channels tend to seep through the canal walls into the crops, thereby watering them)
- Size of property, e.g., total acreage, and
- Percentage of property cultivated (planted).

In some instances, a given well may be metered but may lack a telemetry link to a WAMP 150. In some embodiments, such a meter lacking a telemetry link may be read manually and that meter reading data may be uploaded to the WAMP 150. For example, such manually acquired meter reading data may be entered into a template such as a spreadsheet and then uploaded to the WAMP 150—perhaps in comma separated value (CSV) file format.

In some embodiments, a WAMP 150 utilizing Resource Monitor 264 may facilitate a GMA to determine, analyze, manage, regulate, record and report the state of water resources within the GMA's district—particularly groundwater, but also possibly surface water. A GMA may for example report details of its water resources to district members and stakeholders, government regulatory agencies, and interested organizations such as universities and government research organizations.

A WAMP 150 may for instance utilize Resource Monitor 264 to synthesize model(s) of the complex subsurface conditions of a GMA district's groundwater basin. So for example, Resource Monitor 264 may analyze measurements of a groundwater basin to generate one or more three-dimensional aquifer system model(s). Such three-dimensional models may then be utilized by Resource Monitor 264 to simulate and measure complex sub-surface conditions within the basin. So for example, utilizing hydrological assessments made within the basin, Resource Monitor 264 may facilitate a sustainability manager to adjust the basin model to incorporate various macro-level variables (such as maximum sustainable yield, inputs and outputs etc.) so as to determine more widespread effective and efficient sustainable management practices for the basin.

In some embodiments a WAMP 150 may utilize Resource Monitor 264 to maintain sustainable groundwater yields facilitated by WAMP 150 'water balance modeling'. Water balance modeling may analyze and extrapolate groundwater extraction and use data—imputed as well as measured—to analytically project water consumers needs (e.g., the volume of water an irrigator needs to keep his crop alive) and forecast potential future changes in groundwater sustainability. Such modeling is not static, but rather a highly dynamic set of facilities, whereby a sustainability manager may revise models and/or update and filter data sets. Furthermore. Resource Monitor 264 may enable a sustainability manager to compare prior water balance modeling forecasts to the corresponding realized real world outcomes. Such comparison combined with re-running of the water balance modeling with alterations to the modeling algorithm and or dataset, may facilitate a sustainability manager to evaluate, refine and calibrate WAMP 150 water balance modeling over time so as to get improved forecasts.

In some embodiments, WAMP 150 water balance modeling may be highly scalable—from the entire district down to an individual property or even an individual crop on a portion of one property. In fact, utilizing shared data from additional GMAs or third parties, water balance modeling can be scaled up to a regional, statewide or even global scope. Water balance modeling may be scalable in other ways—a model may span a week, a month, a season, a year or multiple years. For example, data from drought years may be utilized while skipping intervening wetter years. Additionally, datasets utilized for modeling can be set to reflect expected future conditions—perhaps reflecting worst-case climate change scenarios. Multiple incremental changes may be modeled yielding a spectrum of forecasts.

Consider for example a sustainability manager who wants to estimate the change in groundwater extraction resulting from a change in the mix of crops a farmer grows. She can vary the hypothetical crop mix, maturity of trees in orchards, disease conditions, rainfall and climatic conditions and numerous other variables.

In some embodiments, Resource Monitor 264 may integrate economic factors (e.g., crop yields and commodity pricing) into water balance modeling so as to forecast economic consequences of various groundwater extraction and utilization scenarios. For instance, decreasing irrigation per acre of filbert nuts might decrease yields—however a smaller harvest in a tight market might boost prices more than enough to compensate. In addition to experience-based scenario adjustments by a sustainability manager, a WAMP 150 may automatically generate and model millions of scenarios and rank those with exceptional outcomes for review by a sustainability manager.

Resource Monitor 264 may integrate with numerous report generation facilities of a WAMP 150 such that the predictive results of groundwater basin modeling, water balance modeling and/or economic modeling may be quantified in tables of selected data sets and visualized with powerful easy to comprehend graphics. Such an ability to translate results data to information comprehensible by lay-people may be critical to aid GMA stakeholders such as the filbert farmer, the farmer's neighbors, local politicians and community leaders to grasp the scope and urgency of adjusting to changes in groundwater sustainability.

In some embodiments, a sustainability manager may configure Resource Monitor 264 so as to set an action notification or notifications based on comparison of real world measurements to water balance modeling forecasts, such that congruency between the two may be brought to the manager's attention. (See Activity Manager 269 description further below for a discussion of action notifications.)

In some embodiments, Water Accounter 266 may function as associative and analytic nexus for data relating to a GMA's water resource management (e.g., consumption, conservation, regulation and revenue generation)—particularly as relates to groundwater, but possibly as relates to surface water as well. Water Accounter 266 may utilize one or more of WAMP Database(s) 158. Water Accounter 266 may facilitate services related to water consumption, billing and reporting within a GMA's district where such services may be made apparent to a WAMP 150 user via WAMP 150 facilitator(s) 241-246.

Water Accounter 266 may utilize Resource and Physical Plant Database 293, Jurisdiction and Rights Database 291, User Database 292 and Weather and Climate Database 294 to determine water consumption, conservation, water use patterns, availability, distribution, utilization, loss, quality and other water-resource related characteristics for a given GMA district property or member, which may for example be utilized as a source of data for water balance modeling and/or for determining billing rates and/or fees.

Similar to Resource Monitor 264, Water Accounter 266 may in some embodiments of a WAMP 150 utilize an imputation engine capability to measure groundwater consumption from unmetered wells. To conceptually distinguish the two WAMP 150 facilities, Resource Monitor 264 may for example be thought of as relating to the water resources of a GMA's district (e.g., how much water may be there and where, how much may be extracted and what it may be utilized for); whereas Water Accounter 266 may for example be thought of as relating to the water consumption within a GMA's district (e.g., how much water may be being extracted and consumed and who may be consuming it). In some embodiments of a WAMP 150 Resource Monitor 264 and Water Accounter 266 facilities may be logically combined. In fact, grouping and naming facilities of a WAMP 150 as described herein may be intended to aid in understanding of the utility of such facilities as opposed to any specific embodiment.

In some embodiments, a WAMP 150 utilizing Water Accounter 266 may facilitate a GMA to determine, analyze, manage, regulate, derive revenue from, record and report water consumption-particularly of groundwater, but also possibly surface water—on a property-by-property granularity within the GMA's district—but which may additionally be aggregated to give a broader perspective up to and including district-wide.

In addition to utilizing imputation engine capability, Water Accounter 266 may utilize a WAMP 150 shared data access control engine capability. For example for a WAMP 150 utilized by a VGMA, the shared data access control engine may facilitate parallel secure billing facilities with a given such facility—separately configurable and operable by each one of the constituent water management agencies within the VGMA such that they may protect proprietary financial information.

A WAMP 150 Water Accounter 266 may in some embodiments utilize an 'external system interworking engine' capability that may facilitate interoperation with third party systems such as a CRM system and/or a business financials system. So for example, such an external system interworking engine may be utilized by a WAMP 150 to export property-specific fee information to an incumbent business financials system utilized by a GMA. Such a business financials system may for example utilize such property-specific fee information to prepare unified utility bills (e.g., water and electricity) or to calculate taxes or perhaps a revenue split. Similar to an incumbent CRM system, a business financials system may be deeply integrated into the operation of a GMA and GMA staff may be trained on and loyal to such an incumbent business financials system. However, a WAMP 150 may provide unique facilities—for example groundwater extraction fee calculation—that may not be practically performed by such a business financials system. In some instances, Water Accounter 266 may utilize an external system interworking engine to import data from a legacy operation system perhaps on a repetitive basis, for example, to remain current on the status of GMA members' accounts. For example, a WAMP 150 may perhaps utilize an external system interworking engine to overlay a user interface onto a business financials system so as to make it easier for a sustainability manager to navigate back and forth between the VGMA 150 and the legacy business financials system. Or perhaps the data base record definitions of a business financials system may be augmented so as to support the operation of the WAMP 150 and minimize the utilization of a WAMP 150 to manage the production and distribution of bills to a GMA's members. Water Accounter 266 may perhaps utilize data base record definitions compliant with such a business financials system such that member records from such a business financials system may be more easily imported and exported between a WAMP 150 and a business financials system.

In some embodiments, Water Marketer 268 may function as associative and analytic nexus for data relating to a GMA's WAMP-150 facilitated electronic water rights exchange. Water Marketer 268 may utilize one or more of WAMP Database(s) 158 including but not limited to Jurisdictions and Rights Database 291, User Database 292 as well as Resource and Physical Plant Database 293. Additionally, Water Marketer 268 may utilize Weather and Climate Database 294—for example to analyze and predict water demand.

In some embodiments, Water Marketer 268 may facilitate a GMA to create or facilitate a WAMP 150-facilitated water rights exchange for GMA members (and possibly third parties) to utilize to trade water rights on a temporary (i.e., lease) or permanent (i.e., sale) basis. Furthermore, Water Marketer 268 may utilize a WAMP 150 WER registry to pre-validate and record such water rights transfers. Additionally, Water Marketer 268 may automatically enforce water rights trading rules configured by a GMA—for example to encourage groundwater sustainability.

A WAMP 150 in some embodiments may utilize Water Marketer 268 to facilitate a GMA to plan, monitor, analyze, manage and report upon operations of a WAMP 150-facilitated electronic water rights exchange. Water Marketer 268 for example provide GMA configured notifications and alerts when for example an important indicator thresh-old has been crossed.

In some embodiments of a WAMP 150, Water Marketer 268 may utilize an external system interworking engine capability to facilitate a portal service to external markets. Water Marketer 268 may provide a GMA access to and perhaps share appropriate water rights data with one or more third party water rights market facility (or perhaps commodity exchange(s)). Water Marketer 268 may perhaps facilitate a GMA itself to trade in water rights market(s) or to raise capital based on GMA-owned or regulated water rights assets. Additionally, Water Marketer 268 may provide a GMA visibility into local, regional and/or global markets and may therefore provide support for a GMA's pricing, fee and/or sustainability policies for in-basin water extraction and/or usage.

In some embodiments, a WAMP 150 may utilize a combination of synergistically interworking WAMP 150 facilities to provide easy-to-use powerful services to users of a GMA's WAMP 150. For example, a WAMP 150 may utilize Resource Monitor 264 to model and analyze the GMA's groundwater basin and then utilize Water Marketer 268 to derive trading rules for utilization in a WAMP 150-facilitated electronic water rights exchange-perhaps managing transfers of water extraction rights between prop-erties in different zones. Further by example, 3-D modeling of subsurface conditions by Resource Monitor 264 may be utilized by Water Marketer 268 to facilitate a sustainability manager to configure various trading regions within the GMA's jurisdiction (and possibly outside that jurisdiction as well) and define corresponding rules which may govern water transfers within and/or between such trading regions.

In some embodiments, Activity Manager 269 may function as associative and analytic nexus for data relating to a GMA's WAMP-150 facilitated operational activities and workflow. Activity Manager 269 may utilize one or more of WAMP Database(s) 158 including but not limited to Workflow Database 295, Jurisdictions and Rights Database 291, User Database 292 and Resource and Physical Plant Database 293. Additionally, Activity Manager 269 may utilize Weather and Climate Database 294—for example to anticipate changes in workflow due to weather and climactic impact on water demand.

In some embodiments, a sustainability manager may utilize WAMP 150 notification facilities, whereby a WAMP 150 may notify a sustainability manager of a requirement for an action. Such an 'action notification' may be scheduled by a sustainability manager, by a WAMP 150 or may perhaps be triggered by an unscheduled event as determined by a WAMP 150. Furthermore, a WAMP 150 may facilitate a sustainability manager to manage action notifications. For example, a sustainability manager may utilize WAMP 150 generated list(s) of pending action notifications as well as action notifications that may have been delivered but perhaps have not yet acted upon.

In some instances, a sustainability manager and/or a WAMP 150 may determine a requirement to take an action or a series of related actions where such a requirement may not be immediate and where in some instances it may be inappropriate to take such action immediately. For example, a farmer may pull a permit to drill a new well, but the action to start monitoring (and perhaps billing for) groundwater extraction by that well may not be taken until the well is completed and placed in service. It is perhaps likely that many action notifications may cause a sustainability manager to communicate and work with GMA members so as to accomplish GMA goals.

In some embodiments, a WAMP 150 may facilitate a sustainability manager to annotate a given action notification to reflect completion of the corresponding action, or other action taken (or perhaps canceled or deferred). Furthermore, a WAMP 150 may facilitate a sustainability manager to inspect, visualize or otherwise comprehend the quantity and nature of pending action notifications. So for example, a sustainability manager may utilize a WAMP 150 calendar displaying date and time and descriptions of scheduled action notifications. In some instances, individual action notifications displayed in such a calendar may be color coded or otherwise marked for importance and/or urgency such that a sustainability manager may anticipate peaks and valleys in his or her pending workload. A WAMP 150 may perhaps set or update the urgency or the importance attributed to a pending action notification; and/or a WAMP 150 facilitate a sustainability manager to do so.

Furthermore, in some embodiments, a WAMP 150 may facilitate a log of delivered action notifications (and any corresponding annotations) that may perhaps be organized to be displayed as a calendar as well. Additionally, a WAMP 150 may facilitate a sustainability managers management of daily tasks by providing a list (or lists) of active action notifications (i.e., action notifications delivered by the WAMP 150, but not yet designated as completed or otherwise deferred or cleared). In this way, a sustainability manager may be facilitated by a WAMP 150 to keep an eye on pending work load, organize day-to-day activity, and also be able to research past activity and determinations by the WAMP 150 and by that sustainability manager and perhaps other GMA staff. In some instances, an action notification may be utilized by a sustainability manager to signal an occurrence that perhaps does not actually require an action by the sustainability manager, e.g., an FYI.

WAMP 150 action notifications may prove to be essential in the operation of a large and/or busy GMA such that staff workload can be visualized and allocated effectively and in a timely fashion. In some embodiments, a WAMP 150 may facilitate a given GMA sustainability manager or other decision maker to direct WAMP 150 assignment and subsequent delivery of an action notification to a sustainability manager or other GMA staff member. In this way for example, a sustainability manager may distribute tasks to subordinates and subsequently utilize the WAMP 150 to monitor the status of those tasks.

In many work organizations, the overall effectiveness of the organization depends on the individual initiative and productivity of workers. Increasingly, organizations expect and facilitate their workers to be self-enabling with the assistance of automated tools such as a WAMP 150. Therefore, in some embodiments a WAMP 150 may be provide facilities that may be custom configured by an individual sustainability manager to best suit his or her work style. A key WAMP 150 facility for managing the day-to-day work of a sustainability manager may be a WAMP 150 dashboard.

In some embodiments, a WAMP 150 may facilitate copying by a sustainability manager of display elements from a given WAMP 150 display page onto that sustainability manager's WAMP 150 dashboard. Furthermore, such a copied display element may be an active display object—perhaps including XML or other active components—such that the copied display may change over time as changes occur to the data displayed by the active display object—as may be understood by one skilled in the art.

In some embodiments, the facilities of a WAMP 150 may be utilized as Software as a Service (SAAS) where the WAMP Server 155 may be owned and operated by a third party providing the "WAMP Service" to GMAs—i.e., as a "cloud service". So for example, the WAMP 150 may be hosted on a fault tolerant WAMP Server 155 in a secure data center in North Dakota, while the GMA customers for the WAMP service may be located in another state—say California. Multiple GMAs may thusly share the same WAMP Server 155. Each GMA's WAMP service may effectively run independently on the shared WAMP Server 155 as if it were a dedicated server. Although utilizing the same server hardware, each GMA's data may be securely protected from accidental or intentional access by another GMA, or by another GMA's property managers and other users, or by a third party. However, for instances of a VGMA, the data for multiple GMAs participating in that VGMA may be accessed and aggregated as appropriate for the purposes of that VGMA with safeguards and restrictions on data access and data utilization by a WAMP 150 shared data access control engine as described previously. Additionally, data may be exported from a given GMA's WAMP Database(s) 158 and imported to another GMA's WAMP Database(s) 158—perhaps both on the same WAMP Server 155—in instances when both such GMAs have appropriately configured such an exchange of data.

The following discussions and references to figures are provided to illustrate a set of exemplary scenarios for some embodiments of a WAMP 150. The examples may include particular limitations which are unique to the given example and are not intended to extend to the invention as a whole. Likewise, some examples may have been simplified in order to aid in clarity. It is understood that while the foregoing examples aid in explanation and clarification of the present invention, these examples do not limit the scope or function of the present invention.

In some instances, graphic representations with the appearance of screenshots from a personal computer terminal screen may be provided by way of example to aid in the illustration of some embodiments. This is not intended to imply that personal computer terminals are preferred to the exclusion of other terminal device types. The exemplary display screen narrative that follows may exemplify the experience of a sustainability manager user. Other user types may access displays appropriate to their use and to their terminal devices; and therefore such displays may potentially differ in appearance and facilities from those displayed to a sustainability manager.

II. Crop Based Ground Water Calculations

The present invention relates to the calculation of water levels based upon correlations to crop coverage in a particular region. Since these regions tend to be very large, with rotating crops, or where crop data is simply unavailable, there is a need to determine crop coverage in a ubiquitous and cost-effective manner. To this end, the present embodiments utilize aerial imagery, and provide these imaged to a trained machine learning system for crop classification. Crop type and amounts are important considerations in the determination of how much water is being consumed in a given region. When combined with surface water data, evaporation calculations, and precipitation data, it is possible to generate a relatively accurate measure of the change in total water in a region. Necessarily, this water change is attributable to a change in the underlying aquifer.

Figure 4:
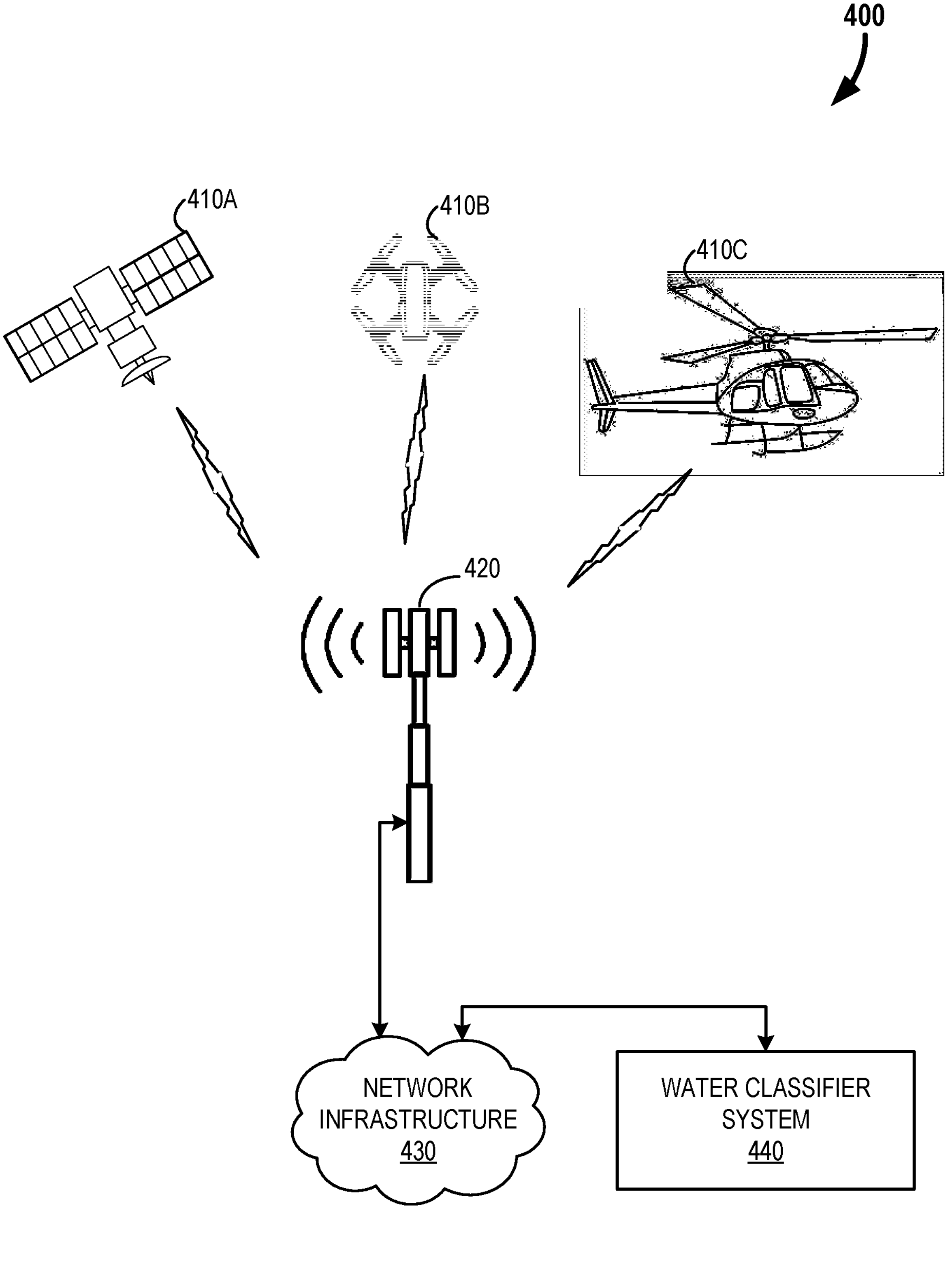
FIG. 4 illustrates an exemplary environment for the monitoring and calculation of groundwater levels, in accordance with some embodiments.

To facilitate discussion, FIG. 4 provides an example illustration of a system 400 capable of collection and classification of crop imagery. Generally, the images collected may be taken by satellites 410*a*, drones 410*b* or aircraft 410*c*. In some embodiments, miniature satellite clusters, such as those being deployed by SpaceX, may be ideally suited for the collection of frequent images over a substantial area.

While the focus of this disclosure will be upon visible light images (e.g., pictures), alternate imagery may be employed either instead of, or complementary to visible light images. For example, ultraviolet light images may be well suited for the purposes of identifying plant characteristics that can help distinguish between different crop types.

Likewise, LiDAR imagery may help in determining ground topography, as well as crop contour and heights, which can be particularly effective in differentiating between different crop types. However, for the sake of clarity, the following discussion will assume the images being analyzed are within the visual spectrum. This, however, is not intended to limit the scope of the present disclosure.

Regardless of image collection, the images are then transmitted, via a satellite relay, cellular tower, or other antenna array 420 to a network 430. The network 430 may consist of a local area network (LAN), a wide area network (WAN), or some combination thereof. In many cases, the network 430 may consist, at least in part, of a cellular network and/or the internet. The network couples the image collection devices to a water classifier system 440 that performs the crop identification and correlation to groundwater levels.

In some less common circumstances, the data collected by the aerial imagery device 410*a-c* may be downloaded into a portable memory storage device. This device may be coupled to a node of the network 430, thereby eliminating the need for transmission over the antenna 420. This may be advantageous when the image resolution is very high, and the device collecting the images is accessible. For example, a memory card located in a drone 410*b* may be better suited for image collection as compared to the drone 410*b* transmitting the imagery data. This memory card may then be plugged into a computer terminal for transmission via the internet to the backend water classification system, in this example embodiment. It is even possible that significant data collection may be directly sent to the water classifier system 440 via memory transport services, such as Amazon's Snowball service.

Figure 5:
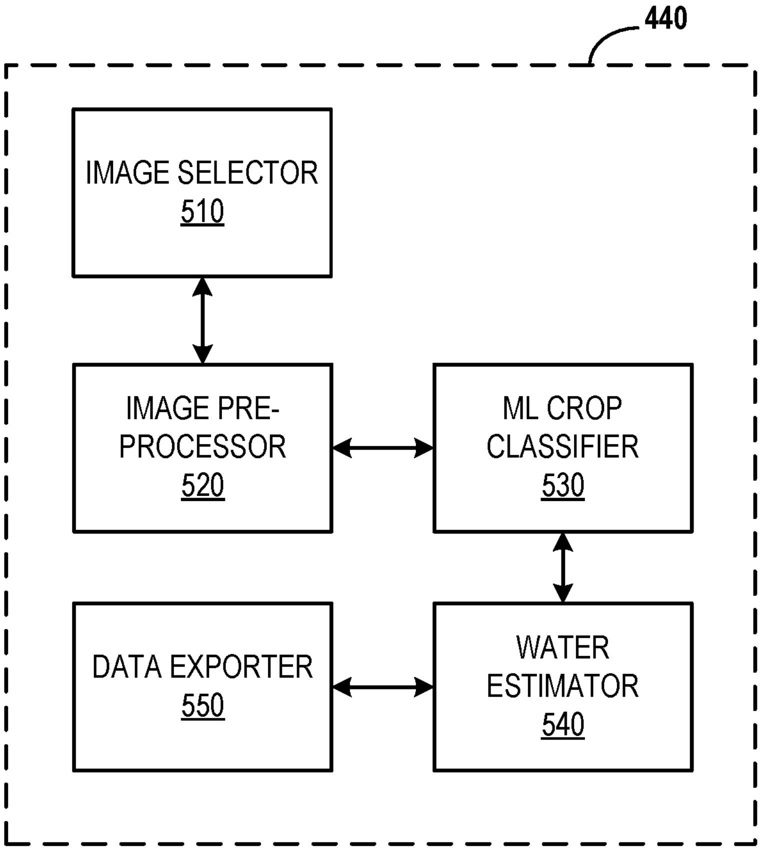
FIG. 5 is a functional block diagram of the water classification system of FIG. 1, in accordance with some embodiments.

Regardless of transmission mechanism, the water classifier system 440 digests the images and generates an estimate of the groundwater present in the underlying aquafer. FIG. 5 provides a more detailed logical block diagram of an example embodiment of the water classifier system 440. Often, there are many images available of a particular region. For example, much of the earth is already mapped by Google Earth. Many counties and provinces also have separately collected aerial imagery. The system is designed to consume a large number of images from many sources. An image selector 510 then parses through the images to select the image(s) with the highest levels of resolution, taken at the proper time. These image(s) are then sent for processing by an image pre-processor 520 in order to make them best suited for consumption by the machine learning crop classifier 530. This pre-processing may include resolution enhancement algorithms, color and contrast modification, and image merging, as will be discussed in greater detail below.

The machine learning crop classifier 530 may include a deep learning neural network. This neural network is trained using thousands to millions of crop images where the crop type is known. In some embodiments, the USDA maintains a listing of known crops for some land areas at particular times. These records are not complete, but enough exist to generate a training set, when combined with aerial images that correspond to the same locations at the given dates. These known images are fed into the machine learning classifier 530 to generate the AI algorithms that can consume the processed images for crop determination.

Once the crops are identified, the information is sent to a water estimator 540, which correlates the crop coverage to the groundwater levels. In some embodiments, the crop coverage for the entire region covering an aquifer is determined. The percentage of coverage of each crop is determined. Weather patterns are also collected. Based upon heat levels and humidity, it is known how much water is needed to sustain the given crops. The surface water, is generally a known quantity, as snowpack and stream/river flow is monitored closely in many regions. As such, the amount of water entering and exiting the region by surface water sources is easily calculated. Evaporation based upon the same weather information, and the total area of the aquifer region is also computed. The drain on the aquifer is thus calculated by the following equation:

$$A=R+S_i-S_o-E-\Sigma C_n$$

Where A is the water change within the aquifer;

R is rainfall within the aquifer region;

$S_i$ is the surface water entering the aquifer region;

$S_o$ is the surface water exiting the aquifer region;

E is the water calculated to have evaporated in the aquifer region; and $C_n$ is the summation of the water consumed by the various crops within the aquifer region.

Generally, during high heat and low snowpack (drought) times, the aquifer may experience a significant negative change in water levels. In times of large snowfall, rain and mild weather, the change in the aquifer is positive. The change in the aquifer level (A) may then be applied to the last known groundwater level to compute the new water levels.

It is also possible to cross reference the calculated groundwater levels to known groundwater data (from test wells for example), when available. This may lead to a calibration factor that may be multiplied against the aquifer level change (A). After the water levels for a given region are thus computed, the data may be made available for downstream consumption by a data exporter 550.

Figure 6:
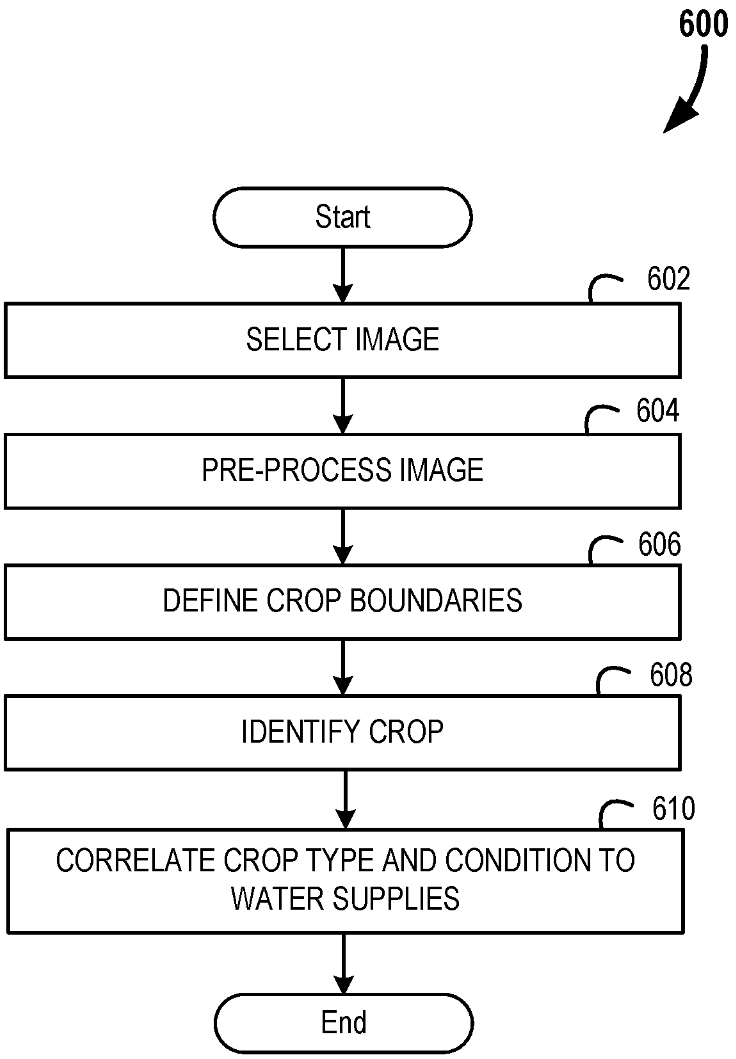
FIG. 6 is a flow diagram for an example process for the calculation of groundwater levels using aerial imagery, in accordance with some embodiments.
Figure 7:
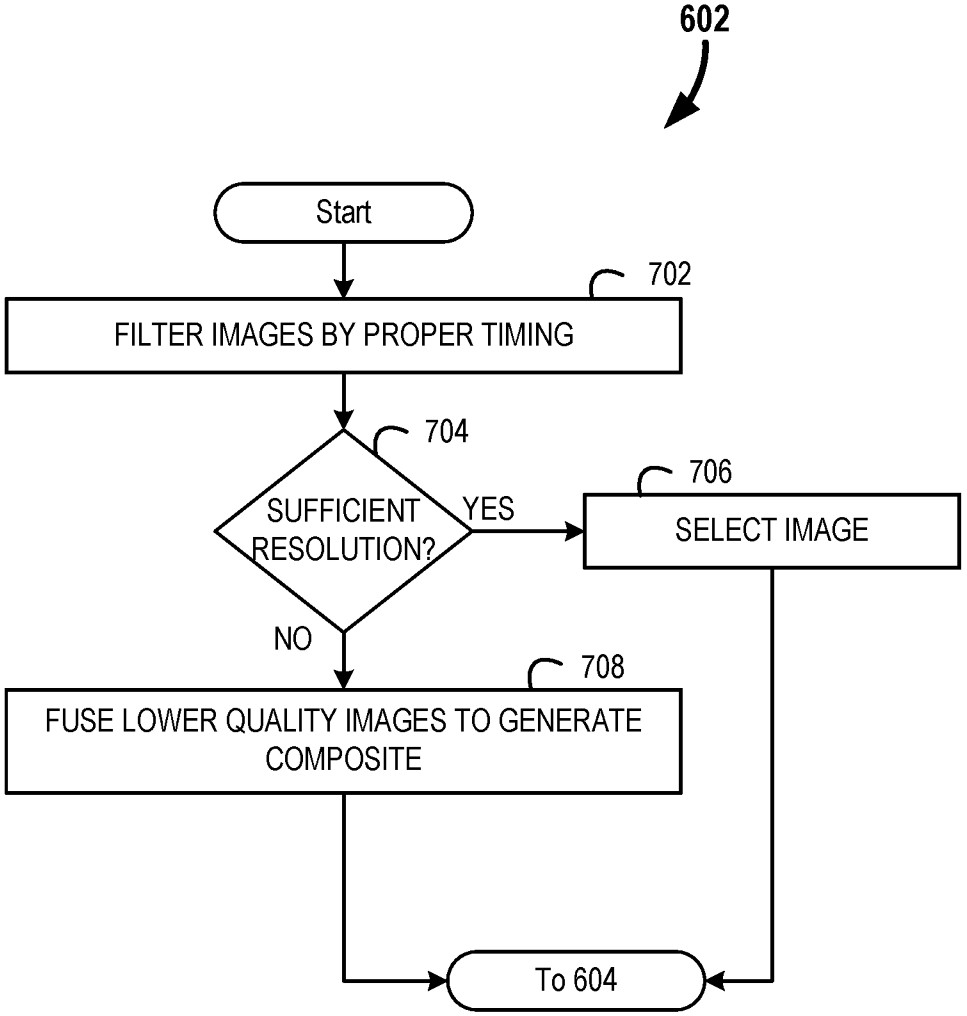
FIG. 7 is a flow diagram for an example process for image selection, in accordance with some embodiments.

Turning now to FIG. 6, a flow diagram for the example process of water level determination is provided, shown generally at 600. In this example process, the image is first collected (at 602). Image selection is shown in greater detail in relation with FIG. 7. Initially the images available are filtered by proper timing (at 702). It is important that if the water calculation is for a given timeframe, that the proper crops are being analyzed for, as many crop fields are routinely rotated in order to maintain healthy soil conditions, or to better meet market demands. Next the system makes a determination (at 704) of whether any of the images that are in the filtered data set are of sufficient resolution for proper classification. If so, the high resolution image is selected for analysis (at 706). If not, then the system may fuse together multiple images in order to generate an amalgamated image with sufficient resolution to allow for downstream analysis (at 708).

Returning to FIG. 6, the images that have been selected are then pre-processed (at 304). Image pre-processing includes applying known image enhancement/resolution improvement algorithms. Additionally, color and contract corrections may be employed to make images more consistent. Specialty corrections may be made based upon the image source as well. For example, particular drone imagery may be impacted significantly by the weather, and color may be 'washed out' as a result. When such images are received (identifiable by the image metadata), a saturation correction could be applied.

Figure 8:
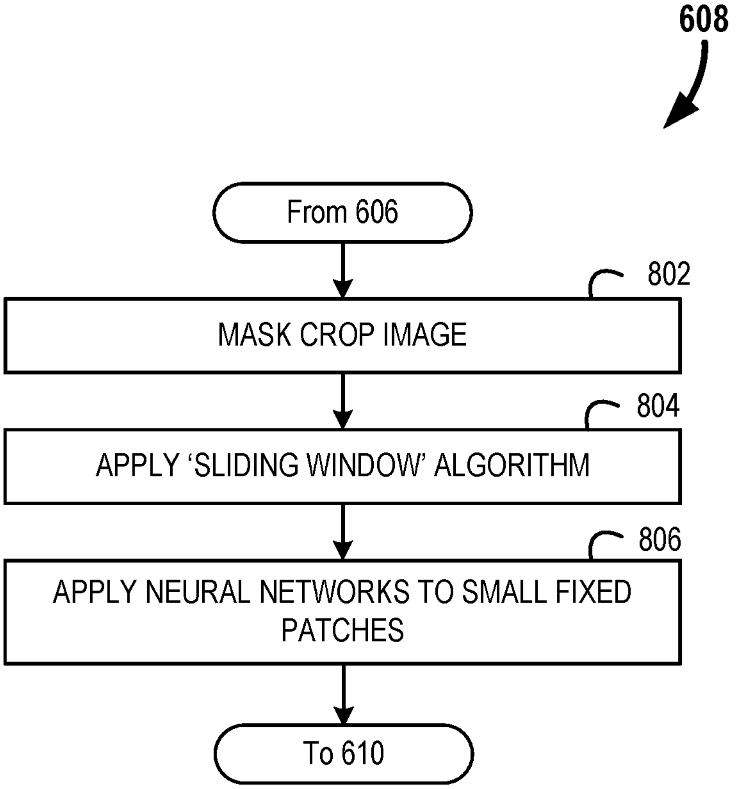
FIG. 8 is a flow diagram for an example process for crop identification, in accordance with some embodiments.

After image pre-processing the machine learning algorithm may define the crop boundaries (at 606). Crops are generally planted in square, rectangular, circular, and semi-circular shapes, based upon ease of planting and harvesting using combine harvesters, tractors, and watering equipment. Additionally, land is generally sold in rectangular plots based upon historical land divisions/grants. Edge identification, and similarity algorithms are employed to identify contiguous regions of a crop. After crop boundaries are determined, the crops are identified (at 608), as seen in greater detail in relation with FIG. 8. The crop image is initially masked (at 802), where areas outside of the crop are discarded for the purposes of crop identification. A sliding window algorithm is applied to the masked image (at 804), which generates small fixed-sized patches of crop imagery for usage by the classifier. The machine learning neural network then consumes these fixed patches to identify the crops as compared to the training data sets (at 806). It has been found that the area coverage of the ground varies an appreciable amount from crop to crop, and this may be a primary indicator of the type of crop located in any given image.

Each "patch" of the image that is analyzed will include a classification as well as a confidence level in the classification. Crops can be identified as a specific crop type, or as fallow land. For the continuous crop region, these patches are aggregated into a final classification and confidence level. In some cases, the classification may vary between patches of the same crop. In such situations, the classifications with the higher confidence levels are used to classify the entire contiguous crop region, unless they are vastly outnumbered (less than 30% for example) by another classification (albeit with a lower confidence level). In some cases, the percentage of one classification as compared to another in order for the lower confidence classification to be used may vary based upon the difference between the confidence levels of the two classifications. For example, assume we have ten 'patches' of imagery being analyzed which constitute a contiguous crop field. In our first example, seven of the patches are identifies as almonds with an average confidence of 54%. The other three patches are identified as oranges at 67% confidence. In this situation, the crop may be classified as almonds, as there is not a large difference in confidence levels, and there are a significantly larger number of almond classifications. Now consider this example: eight parches are classified as almonds at 60% confidence, yet two patches are classified as oranges with a 98% confidence. Here the entire crop would be classified as oranges given the significant difference in confidences. In some embodiments, the difference in confidence levels between the different classifications may be linearly related to how large a percentage of the total "patches" are needed to be the higher confidence level in order to find the entire region to be this classification.

Returning to FIG. 6, after crops have been identified the groundwater levels may be correlated, in the manner discussed in detail above (at 610). This groundwater data may then be utilized by groundwater managers and other interested parties.

II. Systems

Figure 9A:
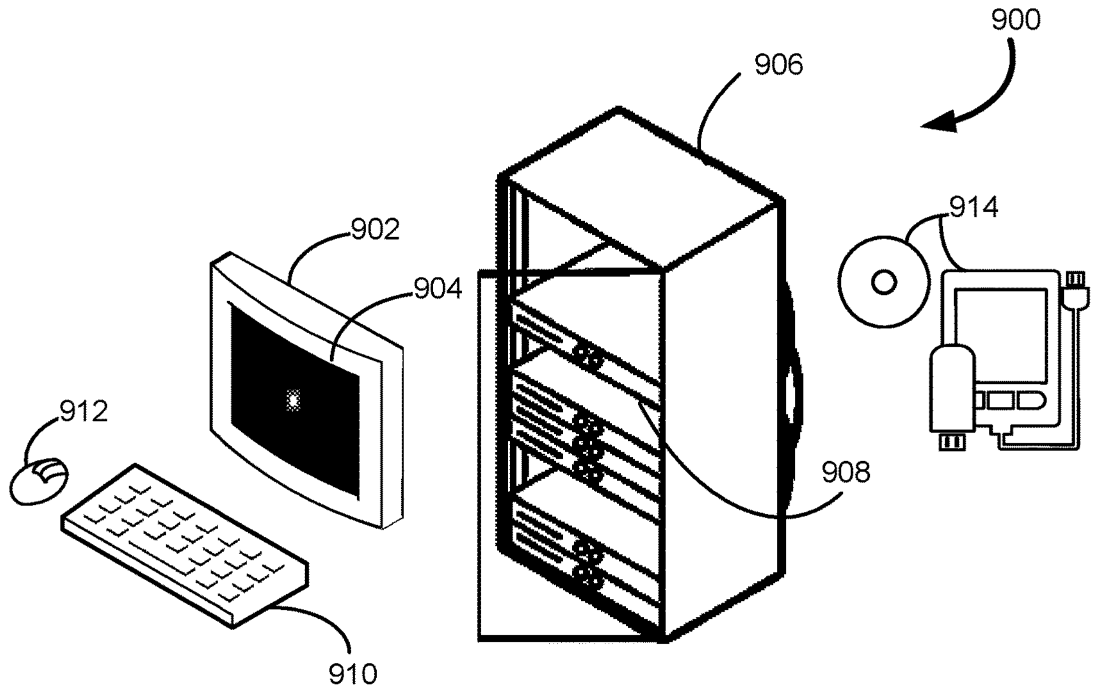
FIGS. 9A and 9B are illustrations of computer systems capable of implementing the groundwater calculation system, in accordance with some embodiments.
Figure 9B:
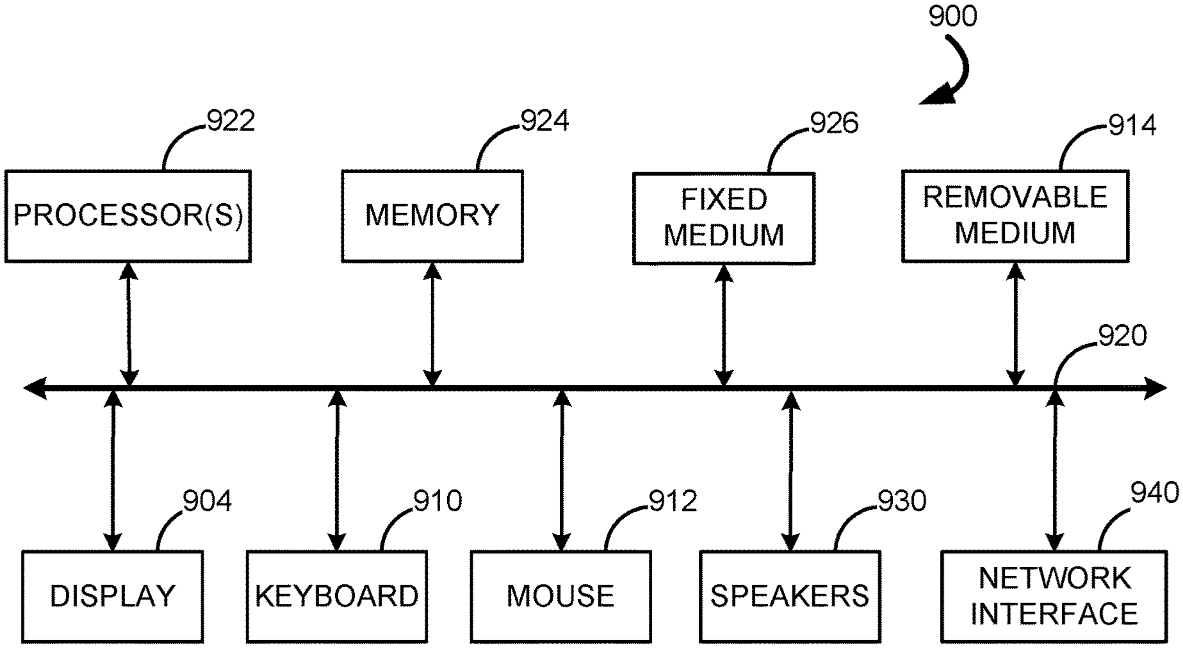

Now that the systems and methods for groundwater calculations reliant upon crop identification have been provided, attention shall now be focused upon apparatuses capable of executing the above functions in real-time. To facilitate this discussion, FIGS. 9A and 9B illustrate a Computer System 900, which is suitable for implementing embodiments of the present invention. FIG. 9A shows one possible physical form of the Computer System 900. Of course, the Computer System 900 may have many physical forms ranging from a printed circuit board, an integrated circuit, and a small handheld device up to a huge super computer. Computer system 900 may include a Monitor 902, a Display 904, a Housing 906, server blades including one or more storage Drives 908, a Keyboard 910, and a Mouse 912. Medium 914 is a computer-readable medium used to transfer data to and from Computer System 900.

FIG. 9B is an example of a block diagram for Computer System 900. Attached to System Bus 920 are a wide variety of subsystems. Processor(s) 922 (also referred to as central processing units, or CPUs) are coupled to storage devices, including Memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable form of the computer-readable media described below. A Fixed Medium 926 may also be coupled bi-directionally to the Processor 922; it provides additional data storage capacity and may also include any of the computer-readable media described below. Fixed Medium 926 may be used to store programs, data, and the like and is typically a secondary storage medium (such as a hard disk) that is slower than primary storage. It will be appreciated that the information retained within Fixed Medium 926 may, in appropriate cases, be incorporated in standard fashion as virtual memory in Memory 924. Removable Medium 914 may take the form of any of the computer-readable media described below.

Processor 922 is also coupled to a variety of input/output devices, such as Display 904, Keyboard 910, Mouse 912 and Speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 922 optionally may be coupled to another computer or telecommunications network using Network Interface 940. With such a Network Interface 940, it is contemplated that the Processor 922 might receive information from the network, or might output information to the network in the course of performing the above-described promotion offer generation and redemption. Furthermore, method embodiments of the present invention may execute solely upon Processor 922 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 900 can be controlled by operating system software that includes a file management system, such as a medium operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for classifying crops using aerial imagery comprising:

collecting a plurality of aerial images for a given region; selecting at least one image of the plurality of images for analysis;

determining a crop boundary within the at least one image;

masking areas outside the crop boundary to generate a contiguous crop area;

applying a sliding window algorithm to the contiguous crop area to generate a plurality of patch images;

classifying the patch images using a neural network; and determining a crop type for the contiguous crop area by aggregating the patch image classifications; and calculating groundwater in an aquifer associated with the given region using the determined crop type, wherein the calculating accounts for evaporation within the given region based upon weather patterns, and crop water requirements under the weather patterns.

2. The method of claim 1, wherein the classifying the patch images includes a classification and a confidence level.

3. The method of claim 2, wherein the determining the crop type includes selecting the classifications for the patch images with the highest confidence levels.

4. The method of claim 2, wherein the determining the crop type includes selecting the classifications for the patch images that are most frequent.

5. The method of claim 1, wherein the selecting the at least one image includes:

filtering the plurality of images by a time domain; determining if a sufficient resolution image is available; when the sufficient resolution image is available, selecting said sufficient resolution image; and when no sufficient resolution image is available, fusing lower resolution images into an amalgamated image.

6. The method of claim 1, wherein the aerial images are at least one of visible light images, ultraviolet light images and LiDAR images.

7. The method of claim 1, wherein the aerial images are collected by at least one of a satellite, a drone, or an aircraft.

8. The method of claim 1, wherein the calculating the groundwater in the aquafer includes combining the determined crop type with surface water flows and precipitation.

9. A computer program product embodied in a non-transitory storage medium, which when executed on a computer system performs the steps of:

collecting a plurality of aerial images for a given region; selecting at least one image of the plurality of images for analysis;

determining a crop boundary within the at least one image;

masking areas outside the crop boundary to generate a contiguous crop area;

applying a sliding window algorithm to the contiguous crop area to generate a plurality of patch images;

classifying the patch images using a neural network; and determining a crop type for the contiguous crop area by aggregating the patch image classifications; and calculating groundwater in an aquifer associated with the given region using the determined crop type, wherein the calculating accounts for evaporation within the given region based upon weather patterns, and crop water requirements under the weather patterns.

10. The computer program of claim 9, wherein the classifying the patch images includes a classification and a confidence level.

11. The computer program of claim 10, wherein the determining the crop type includes selecting the classifications for the patch images with the highest confidence levels.

12. The computer program of claim 10, wherein the determining the crop type includes selecting the classifications for the patch images that are most frequent.

13. The computer program product of claim 9, wherein the selecting the at least one image includes:

filtering the plurality of images by a time domain; determining if a sufficient resolution image is available; when the sufficient resolution image is available, selecting said sufficient resolution image; and when no sufficient resolution image is available, fusing lower resolution images into an amalgamated image.

14. The computer program product of claim 9, wherein the aerial images are at least one of visible light images, ultraviolet light images and LiDAR images.

15. The computer program product of claim 9, wherein the aerial images are collected by at least one of a satellite, a drone, or an aircraft.

16. The computer program product of claim 9, wherein the calculating the groundwater in the aquafer includes combining the determined crop type with surface water flows and precipitation.

* * * * *